United States Patent
Morison et al.

(10) Patent No.: US 10,300,420 B2
(45) Date of Patent: May 28, 2019

(54) METHOD OF FILTERING PARTICULATES FROM THE AIR USING A COMPOSITE FILTER SUBSTRATE COMPRISING A MIXTURE OF FIBERS

(71) Applicant: The Procter & Gamble Company, Cincinnati, OH (US)

(72) Inventors: Pamela Marie Morison, Cincinnati, OH (US); Rajeev Chhabra, Mason, OH (US); Dana Paul Gruenbacher, Fairfield, OH (US); David Wesley Monebrake, Eaton, OH (US); Susan L Wilking, Mainville, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 252 days.

(21) Appl. No.: 14/576,254

(22) Filed: Dec. 19, 2014

(65) Prior Publication Data

US 2016/0175754 A1 Jun. 23, 2016

(51) Int. Cl.
| | |
|---|---|
| *B01D 39/08* | (2006.01) |
| *B01D 39/16* | (2006.01) |
| *B01D 46/00* | (2006.01) |
| *B01D 46/02* | (2006.01) |
| *F04D 25/08* | (2006.01) |
| *F04D 29/32* | (2006.01) |
| *F04D 29/70* | (2006.01) |

(52) U.S. Cl.
CPC ......... *B01D 46/0041* (2013.01); *B01D 39/08* (2013.01); *B01D 39/1623* (2013.01); *B01D 46/02* (2013.01); *F04D 25/08* (2013.01); *F04D 29/325* (2013.01); *F04D 29/701* (2013.01); *B01D 2239/064* (2013.01); *B01D 2239/065* (2013.01); *B01D 2239/069* (2013.01); *B01D 2239/0663* (2013.01); *B01D 2239/1233* (2013.01)

(58) Field of Classification Search
CPC ........ B01D 46/02; B01D 46/41; B01D 39/02; B01D 39/41; B01D 39/1623; B01D 2239/064; B01D 2239/065; B01D 2239/069; B01D 2239/1233; F04D 25/08
See application file for complete search history.

(56) References Cited

U.S. PATENT DOCUMENTS

| | | | |
|---|---|---|---|
| 5,143,679 | A | 9/1992 | Weber et al. |
| 5,628,741 | A | 5/1997 | Buell et al. |
| 5,753,343 | A | 5/1998 | Braun et al. |
| 6,835,264 | B2 | 12/2004 | Sayovitz et al. |
| 7,682,686 | B2 | 3/2010 | Curro et al. |

(Continued)

FOREIGN PATENT DOCUMENTS

| | | |
|---|---|---|
| JP | A-H07-256026 | 10/1995 |
| JP | 2001137630 A | 5/2001 |

(Continued)

OTHER PUBLICATIONS

U.S. Appl. No. 14/576,252, filed Dec. 19, 2014, Rajeev Chhabra.

(Continued)

*Primary Examiner* — Jason M Greene
(74) *Attorney, Agent, or Firm* — Abby A. Lopez

(57) ABSTRACT

A method of filtering air using a composite filter substrate having a mixture of fiber shapes and sizes layer is disclosed. The method provides improved particle cleaning efficiency.

12 Claims, 17 Drawing Sheets

(56) References Cited

U.S. PATENT DOCUMENTS

| | | |
|---|---|---|
| 8,512,626 B2 | 8/2013 | Johnson et al. |
| 8,716,549 B2 | 5/2014 | Cheng et al. |
| 8,859,843 B2 | 10/2014 | Tee, Jr. et al. |
| 2001/0029966 A1* | 10/2001 | Wong .................. A47L 13/16 134/6 |
| 2003/0003831 A1 | 1/2003 | Childs et al. |
| 2005/0227564 A1* | 10/2005 | Bond ...................... B32B 5/08 442/337 |
| 2006/0234586 A1 | 10/2006 | Wong et al. |
| 2007/0175195 A1* | 8/2007 | Skirius ............... B01D 39/1623 55/527 |
| 2008/0149561 A1 | 6/2008 | Chu |
| 2008/0202078 A1 | 8/2008 | Healey et al. |
| 2010/0006498 A1 | 1/2010 | Duello et al. |
| 2012/0064280 A1 | 3/2012 | Hammons et al. |
| 2012/0066852 A1 | 3/2012 | Trinkaus et al. |
| 2014/0255100 A1* | 9/2014 | Li, Jr. ...................... B09B 1/00 405/129.75 |
| 2014/0331622 A1 | 11/2014 | Gruenbacher et al. |
| 2014/0331859 A1 | 11/2014 | Gruenbacher et al. |

FOREIGN PATENT DOCUMENTS

| | | |
|---|---|---|
| KR | KR100246936 A | 3/2000 |
| KR | 20120042952 A | 5/2012 |
| WO | WO 97/19808 | 6/1997 |
| WO | WO2005075725 A1 | 8/2005 |
| WO | WO 2008/096045 A1 | 8/2008 |
| WO | WO2014182987 A3 | 12/2014 |

OTHER PUBLICATIONS

PCT Search Report; PCT/US2015/066013; dated Mar. 17, 2016; 11 pages.

PCT Search Report; PCT/US2015/066017; dated Mar. 24, 2016; 11 pages.

* cited by examiner

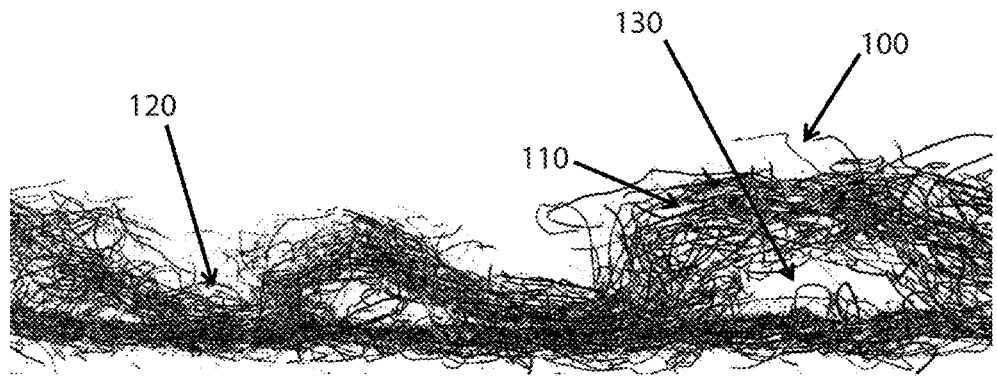
Fig. 5
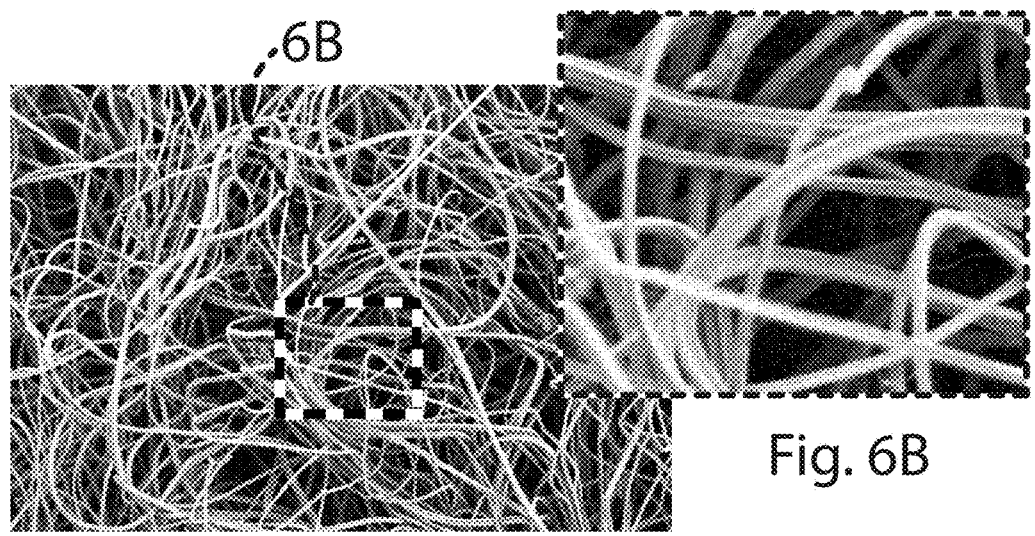
Fig. 6A
Fig. 6B

Fig. 10A
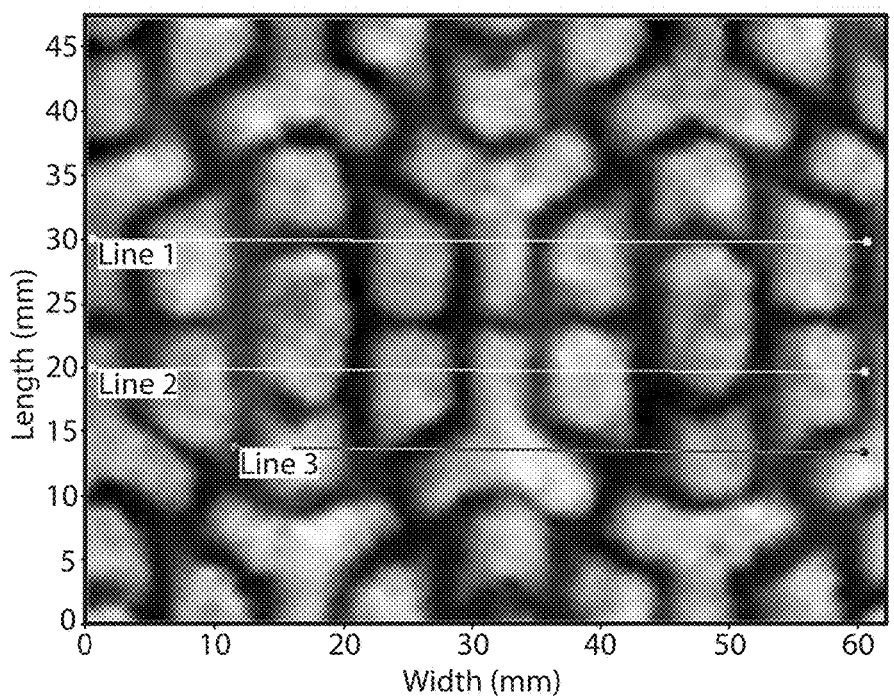
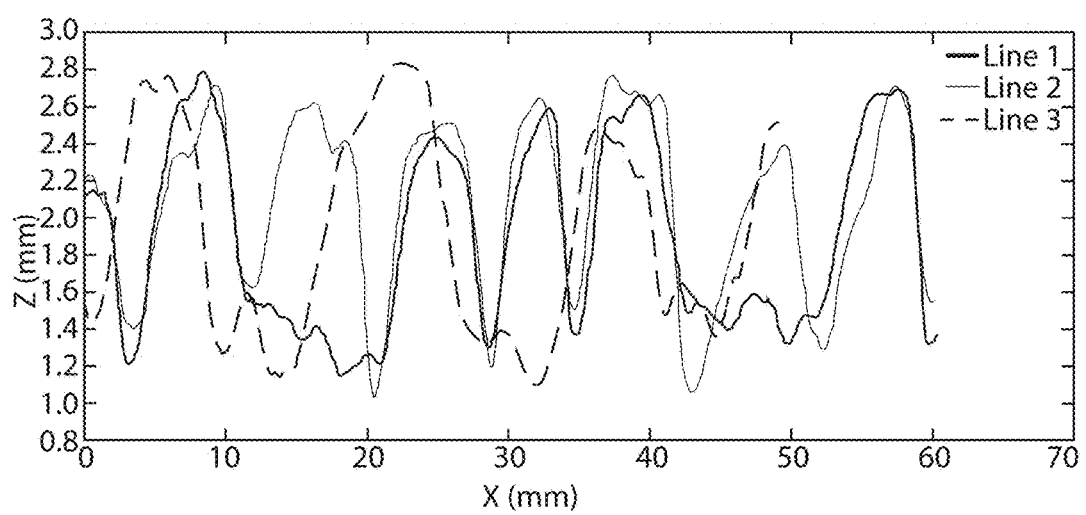
Fig. 10B

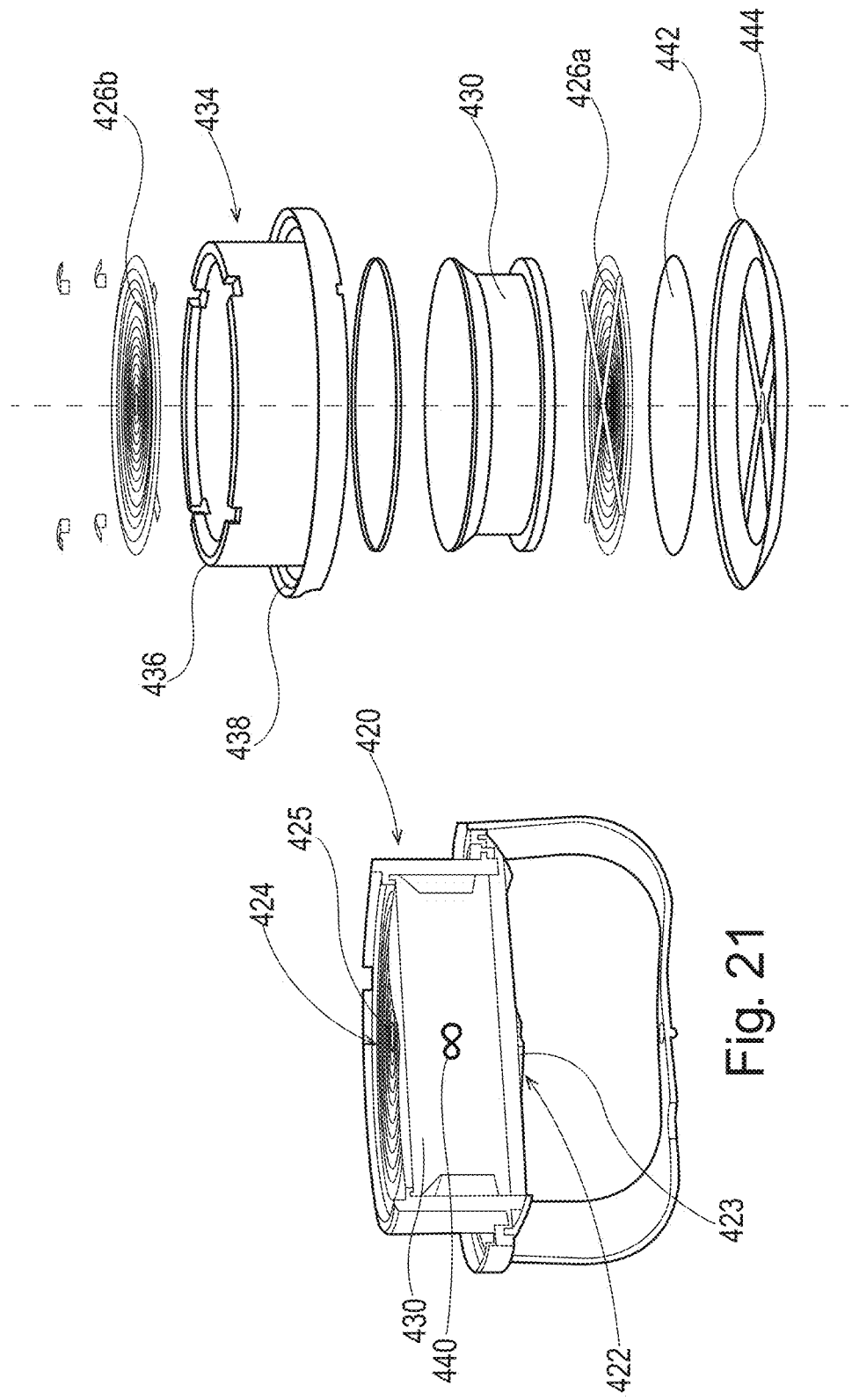

METHOD OF FILTERING PARTICULATES FROM THE AIR USING A COMPOSITE FILTER SUBSTRATE COMPRISING A MIXTURE OF FIBERS

FIELD OF THE INVENTION

The present invention is directed to methods of filtering particulates from the air by providing composite filter substrates comprising a mixture of fibers.

BACKGROUND

Substrates for cleaning and filtering pollutants and particulates on surfaces and in the air are known in the art. Pollutants such as odors (e.g. cigarette smoke), volatile organixc compounds ("VOCs"), microbials (e.g. bacteria, viruses, mold), and particulates (e.g. dust) have a pernicious effect when inhaled or otherwise contacted by human beings. Particulates alone comprise dead skin, pet dander, dust mite feces, and other microscopic (less than 5 microns in size) particulates which may elicit a human immune response.

In addition to particulate cleaning efficiency, consumers may desire filter substrates that provide low pressure drop as air passes through the substrate because this can provide low noise levels. Low noise levels may be attractive to consumers to enable long air filtering operations times (e.g. operating 24 hours a day). Various attempts in the art have been made to provide consumer affordable filter substrates with improved cleaning efficiency and minimal noise. However, improvements on noise and cleaning efficiency typically compromise a manufacturer's ability to produce low cost filter substrates and/or negatively affects another consumer desired aspect of a filter substrate.

Accordingly, there continues to be a need for an improved filter substrate for an air filtering device which cost-effectively, and with improved efficiency, removes particulates from the air while having consumer-friendly features such as compactness/portability and consumer acceptable noise levels.

SUMMARY

The present invention relates to a method of filtering particulates from the air comprising the steps of: (a) providing an air filtering device in a room, wherein said device comprises a fan and an air filter comprising a first component layer comprising a mixture of fibers comprising shaped fibers having at least two different deniers, wherein each fiber in said mixture comprises a denier from about 0.7 dpf to about 7.0 dpf, a plurality of hollow protrusions and recessed regions, wherein said hollow protrusions comprise a protruded length from about 3 mm to about 16 mm and a non-protruded length from about 2 mm to about 14 mm and a protruded height from about 0.5 mm to about 3 mm, and wherein said hollow protrusions and recessed regions comprise a planar area ratio from about 40:60 to about 60:40; and a second component layer comprising at least about 50% of fibers having a denier from about 0.9 dpf to about 2.0; a plurality of connections connecting said first component layer and said second component layer; and (b) activating said fan to move about 70 to about 150 CFM of air to said air filter.

There is also provided a method of filtering particulates from the air comprising the steps of: (a) providing an air filtering device in a room, wherein said device comprises a fan and an air filter bag comprising a first component layer comprising a mixture of tri-lobal fibers having at least two different deniers, wherein each fiber in said mixture comprises a denier from about 0.7 dpf to about 7.0 dpf; a plurality of hollow protrusions; and a second component layer comprising at least about 50% of fibers having a denier from about 0.9 dpf to about 2.0; and a plurality of connections connecting said first component layer and said second component layer; and (b) activating said fan to move from about 70 to about 150 CFM of air to said air filter bag, whereby greater than 40% of particulates of about 1 microns to about 10 microns are removed from the air in said room.

BRIEF DESCRIPTION OF THE DRAWINGS

While the specification concludes with the claims particularly pointing out and distinctly claiming the invention, it is believed that the present invention will be better understood from the following description taken in conjunction with the accompanying drawings in which:

FIG. 5 is a micro-computed tomography image of a cross-sectional view, taken along line 5-5, of the hollow protrusions shown in FIG. 4;

FIG. 6A is a magnified image of one embodiment of a first layer of a composite filter substrate comprising shaped fibers;

FIG. 6B is an enlarged view of the area denoted by the dashed box in 6A;

FIG. 10A is a 3D image (from a GFM MikroCAD optical profiler instrument) of one embodiment of a substrate comprising a plurality of hollow protrusions and recessed regions;

FIG. 10B is a graph depicting the protruded heights of the hollow protrusions taken along lines 1, 2 and 3 in FIG. 10A;

FIG. 21 shows the cross-sectional view of the device in FIG. 19, showing only the base of the device (i.e. device with the outer sleeve, air filter, and related parts removed);

FIG. 22 is an exploded view of the base in FIG. 21.

DETAILED DESCRIPTION

Definitions

Figure 1:
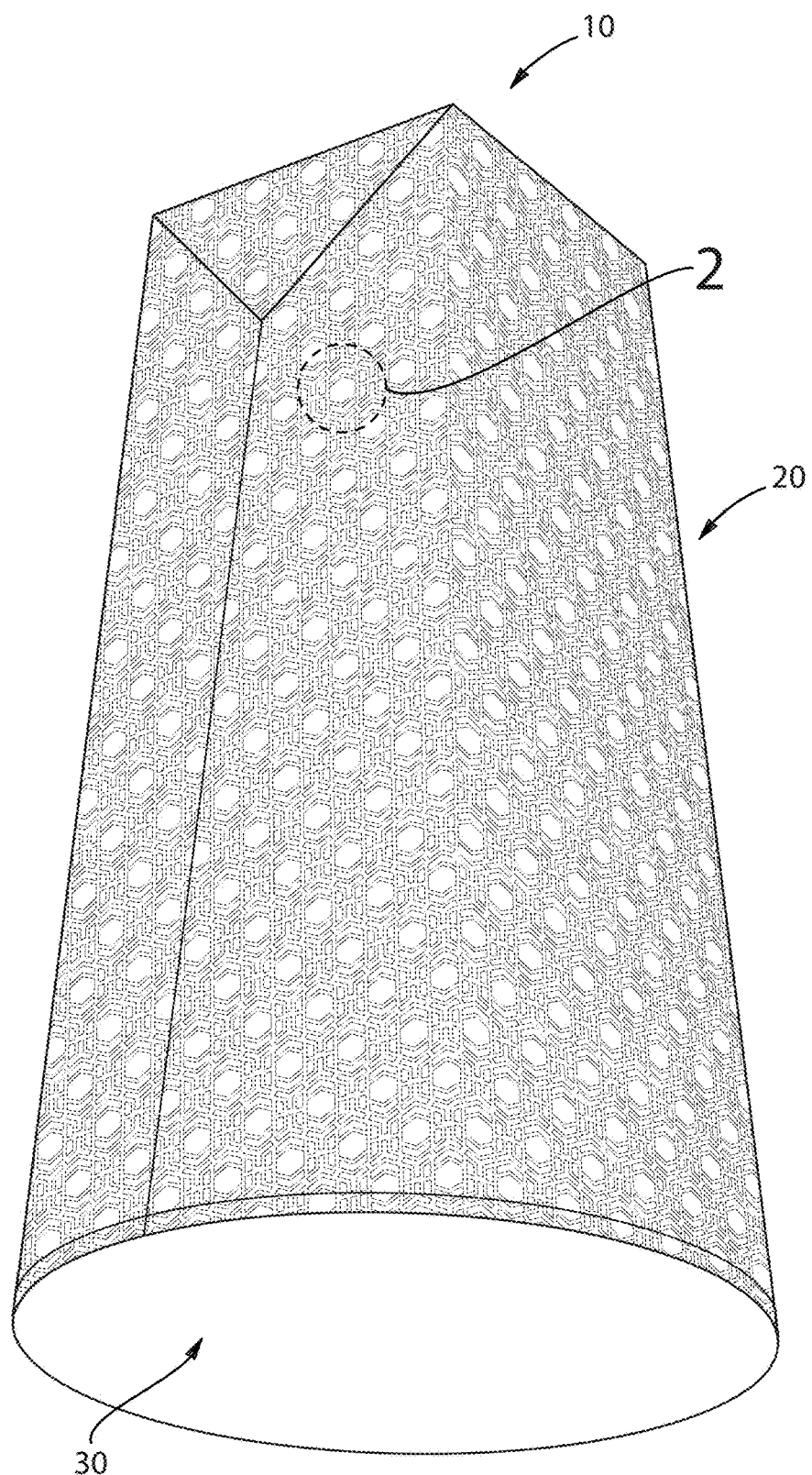
FIG. 1 is a schematic perspective view of one embodiment of a filter substrate comprising a plurality of hollow protrusions.

"Air flow surface area", as used herein, means the permeable area from which air flows through the substrate. This air flow surface area is measured by laying the substrate out flat on a single plane without any folds or pleats (if the substrate has been made into a bag or three dimensional configuration, the substrate must be cut to lay it out flat) and then measuring the total surface area. The measured air flow surface area may not include any areas where a physical or chemical barrier (e.g. a structure or coating on an edge of the filter) prevents air flow through that part of the air filter.

"Basis weight", as used herein, refers to the mass per unit area, generally expressed as grams per square meter ("gsm" or "g/m$^2$"), of the substrate. Basis weight is typically measured by using a standard test method ISO 9073-1:1989 "Test methods for nonwovens—Part 1: Determination of mass per unit area".

"Denier", as used herein, refers to a unit used to indicate the fineness of a filament/fiber. The unit expresses the mass of a filament/fiber in grams per 9000 meters of length. As used herein with respect to the fibrous material, denier is expressed as denier per fiber or filament, or simply "dpf", and is typically a numerical average of many filaments. For known fiber density and cross-sectional area, denier can be calculated as: [fiber density (in kilogram per cubic meter)× cross-sectional area (in square meter)×9000 linear meters of length×1000 (grams per kilogram)].

"Density", as used herein, means bulk density of the fibrous substrate including fibers, voids, or any additives therein. Bulk density (or simply density of the substrate) is calculated from the mass of the substrate (or a section of the substrate) divided by the total volume of the substrate (or respective section whose mass is taken into consideration). Total volume of the substrate includes area occupied by the substrate and its thickness. For a rectangular section of the substrate having a length, a width, and a thickness, total volume can be calculated by multiplying length, width, and thickness of the substrate. Density of the substrate is expressed as kilogram per cubic meter (kg/m$^3$).

"High denier fibers", as used herein means fibers having a denier of at least about 2.2 dpf.

"Hollow protrusion", as used herein, means a macroscopic three-dimensional structure formed by at least two composite layers of fibrous material defining the outer surfaces of the structure and having a volume in between these two layers. The macroscopic three-dimensional structures are readily visible to the naked eye when the perpendicular distance between the viewer's eye and the plane of the substrate is about 12 inches. In other words, the three-dimensional structures of the present invention are substrates that are non-planar, in that one or both surfaces of the sheet exist in multiple planes, where the distance between those planes is observable to the naked eye when the structure is observed from about 12 inches. A suitable analogy to the "hollow protrusion" is the macroscopic three-dimensional structures found in bubble wrap. The inner volume of a "hollow protrusion" can be substantially hollow (i.e., only defined by its outer fibrous layers) or partially filled with fibers (i.e., some fibers occupy some of the volume in between its outer layers).

"Layer", as used herein, refers to a member or component of a substrate whose primary dimension is X-Y, i.e., along its length and width. It should be understood that the term layer is not necessarily limited to single layers or sheets of material. Thus the layer can comprise composites or combinations of several sheets or webs of the requisite type of materials. Accordingly, the term "layer" includes the terms "layers" and "layered."

"Low denier shaped fibers", as used herein, shaped fibers having a denier up to 1.2 dpf.

"Nonwoven", as used herein, refers to a web having a structure of individual fibers or threads which are interlaid, but not in a repeating pattern as in a woven or knitted fabric, which latter types of fabrics do not typically have randomly oriented or substantially randomly-oriented fibers.

"Randomly distributed", as used herein, means fibers are oriented without any preference for a particular direction across and through the thickness (z-direction) of a nonwoven. Fibers in a random distribution can have any orientation, and any two or more neighboring fibers can have a random orientation. In addition to directional orientation, randomly distributed fibers are also spaced at a random distance from one another, without any preference for a particular spacing distance.

"Shaped fiber", as used herein, refers to fibers having a non-round cross-section. Shaped fibers can be of various non-round cross-sectional shapes including delta shaped, multi-lobal shaped, and shaped to include capillary channels on their outer surfaces. The capillary channels can be of various cross-sectional shapes such as "U-shaped", "H-shaped", "C-shaped" and "V-shaped". One capillary channel fiber is T-401 (a polyethylene terephthalate fiber), designated as a 4-deep grooved fiber available from Fiber Innovation Technologies, Johnson City, Tenn., U.S.A. Shaped fibers can be solid or hollow.

"Specific surface area", as used herein, means surface area per unit mass of fibers of the substrate. It is generally expressed in square meter per gram (m$^2$/g) of fibers.

"Thermoplastic", as used herein, refers to a polymer that substantially flows under shear when exposed to heat and returns to its original or solid condition when cooled to room temperature or substantially below its melting point. Examples of thermoplastic materials include, but are not limited to, polyolefins such as polyethylenes and polypropylenes, polyesters such as polyethylene terephthalate and polylactic acid, polyvinyls, polyamides, styrene polymers and copolymers, and acrylics, and combinations thereof.

Composite Filter Substrates

The present invention is directed to methods of filtering particulates from the air by providing a composite filter substrate comprising a mixture of fibers.

Figure 2:
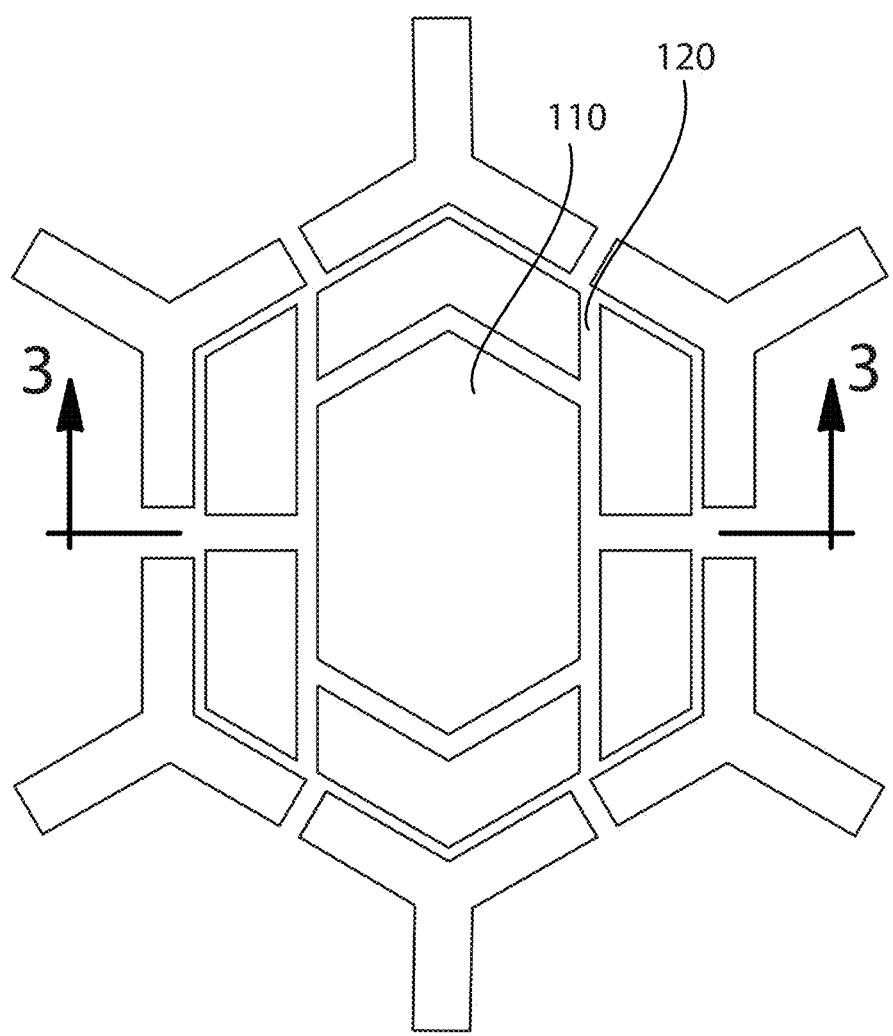
FIG. 2 is an enlarged schematic view of a hollow protrusion denoted by the dashed circle "2" in FIG. 1.
Figure 3:
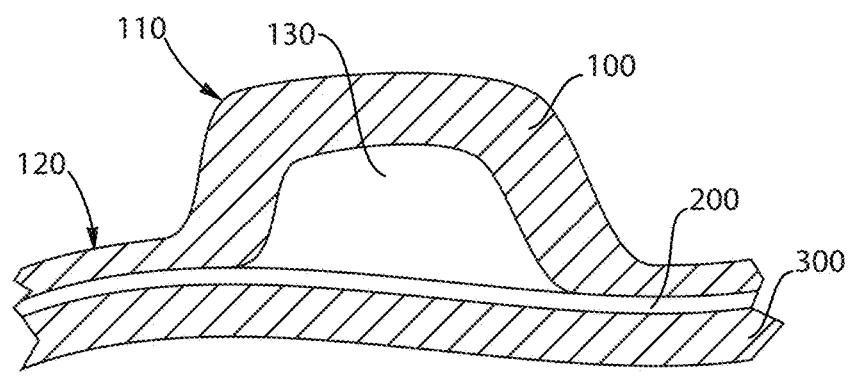
FIG. 3 is a cross-sectional view of the area taken along line 3-3 in FIG. 2 of a hollow protrusion.

Referring to FIGS. 1-3, the composite filter substrate 10 of the present invention is formed from a plurality of component layers. The filter substrate 10 has a first face 20 and a second face 30 and may be configured into sheets, bags, or any shape suitable for filtering particulates or cleaning surfaces. FIG. 1 shows one embodiment of the composite filter substrate 10 formed into a filter bag.

Referring to FIGS. 2 and 3, the substrate 10 is formed from at least a first component layer 100 and a second component layer 200. Additional component layers may be included that are different in construction or formed from the same construction as the first component layer or second component layer. In FIG. 3, a third component layer 300 is shown. The substrate 10 may include hollow protrusions 110 and recessed regions 120 on a first face 10 or second face 20 of the substrate.

Figure 4:
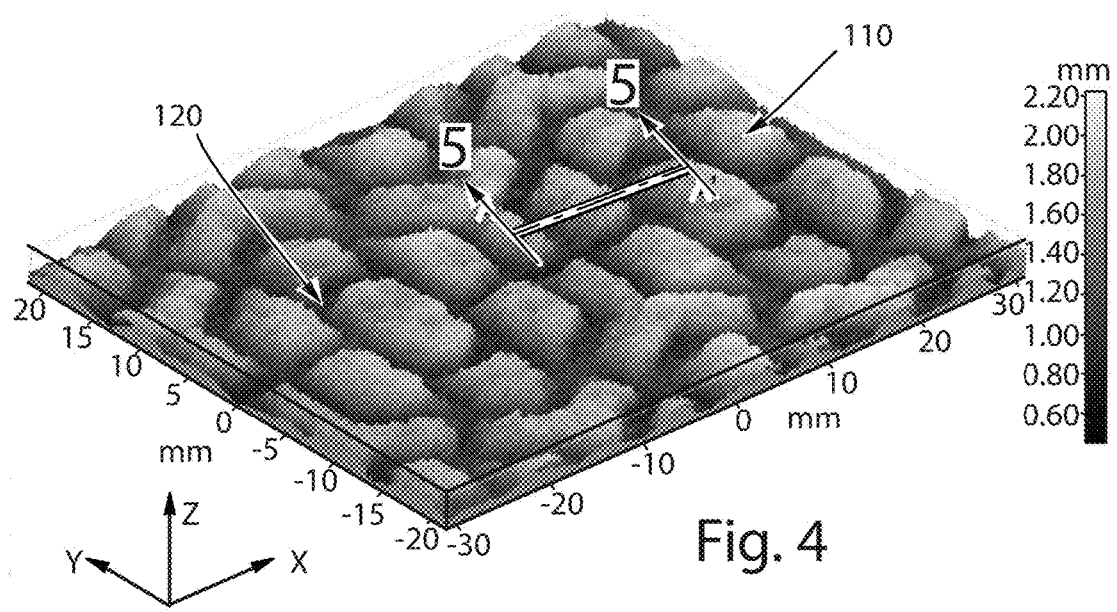
FIG. 4 is a 3D image (from a GFM MikroCAD optical profiler instrument) of one embodiment of a substrate comprising a plurality of hollow protrusions and recessed regions.

Referring to FIG. 4, the substrate 10 has a x-y-z dimensions, wherein x-y includes the plane of the first face 20 and second face 30 of the substrate, and z is the direction perpendicular to the x-y plane or through the thickness of the substrate. The thickness of the substrate is the same direction as the height of a hollow protrusion 110.

The substrate 10 and component layers of the present invention comprise a structure of woven or nonwoven materials. Nonwoven materials can be made using forming operations using melted materials or solid materials laid down on forms, especially on belts, and/or by forming operations involving mechanical actions/modifications carried out on fibers. The component layers may comprise any suitable type of nonwoven material. Suitable types of nonwoven materials include air-laid; wet-laid; carded, including carded hydroentangled, carded through-air-bonded, and carded needle-punched; spunlaid needle-punched; meltblown; spunbond; and spunlaid hydroentangled nonwovens; and combinations thereof. Woven materials can be made using standard textile making processes such as weaving or knitting. The component layers may comprise any suitable type of woven material. Nonlimiting examples of suitable types of woven material include twill weave, broken twill weave, plain weave, drill weave, satin weave, plain Dutch weave, twill Dutch weave, reverse Dutch weave, honeycomb weave, basket weave, warp knit, weft knit, and combinations thereof. Woven materials may be needle felted or hydroentangled to increase specific surface area available to capture dirt in the filter substrate. Yarns used for making woven materials may be monofilament or multifilament. Yarns may be "S" or "Z" twisted to increase durability and surface area of filaments in the woven materials.

The basis weight of the substrate 10 may be as low as about 30 gsm to as high as 200 gsm; or from about 30 gsm to about 100 gsm; or from about 45 gsm to 75 gsm, or from about 50 gsm to about 70 gsm, or from about 50 gsm to about 60 gsm.

The fibers use to form the substrate 10 may be materials including natural fibers, e.g. wood pulp, cotton, wool, and the like, as well as biodegradeable fibers, such as polylactic acid fibers; and synthetic fibers such as thermoplastic fibers including polyolefins (e.g. polypropylene ("PP") and PP copolymers, polyethylene ("PE") and PE copolymers), polyesters such as polyethylene terephthalate ("PET"), polyamides, polyimide, polylactic acid, polyhydroxyalkanoate, polyvinyl alcohol, ethylene vinyl alcohol, polyacrylates, and mixtures, blends, and copolymers; bicomponent, or multicomponent combinations of synthetic polymers and fibers; and synthetic cellulosics (e.g., viscose rayon, lyocell), cellulose acetate, and combinations thereof. The degree of hydrophobicity or hydrophilicity of the fibers is optimized depending upon the desired goal of the sheet, either in terms of type of particulate to be filtered, the type of additive that is provided, when an additive is present, biodegradability, availability, and combinations of such considerations. In general, the more biodegradable materials are hydrophilic, but the more effective materials may be hydrophobic.

The fibers may be continuous fibers, also called filaments, or they may be staple fibers having a length from about 15 mm to about 70 mm, or from about 25 mm to about 60 mm, or from about 30 mm to about 50 mm. The substrate 10 may have a density of less than 80 kg/m$^3$, or less than about 70 kg/m$^3$, or between 10 kg/m$^3$ to about 60 kg/m$^3$. In an embodiment of a 60 gsm hydroentangled substrate, a density from about 20 to about 60 kg/m$^3$ may be provided.

The fibers in component layers of the substrate 10 may be arranged in two or more regions with different densities, such as a low density region and a high density region. The low density region may have density less than about 40 kg/m$^3$, or from about 10 kg/m$^3$ to about 40 kg/m$^3$, or from about 20 kg/m$^3$ to about 35 kg/m$^3$. The high density region may have density greater than 30 kg/m$^3$, or from about 30 kg/m$^3$ to about 80 kg/m$^3$, or from about 35 kg/m$^3$ to about 70 kg/m$^3$. The ratio of densities between the high density region and the low density region may be less than about 2.5, or from about 1.1 to about 2.0, or from about 1.25 to about 2.0. The low density region may occupy an air flow surface area from about 20% to about 80%, or from about 30% to about 70%, or from about 40% to about 60%, or from about 45% to about 55%. The high density region may occupy an air flow surface area from about 20% to about 80%, or from about 30% to about 70%, or from about 40% to about 60%, or from about 45% to about 55%. The low density region occupying an air flow surface area of about 50% may have a density of about 37 kg/m$^3$, and the high density region occupying the air flow surface area of about 50% may have a density of about 45 kg/m$^3$.

Typically, low density regions have higher basis weight than that of the filter substrate 10, while the high density regions have lower basis weight than that of the filter substrate. The low density region may have a basis weight about 1% to about 20%, or about 1% to about 10%, or about 1% to about 5% more than the average basis weight of the substrate. The high density region may have a basis weight about 1% to about 20%, or about 1% to about 10%, or about 1% to about 5% less than the average basis weight of the substrate. Density and basis weight of high and low density regions can be measured using the methods described herein. In a 60 gsm substrate, the low density regions may have a basis weight from about 60.6 gsm to about 66 gsm, and the high density regions may have a basis weight from about 59.4 gsm to about 54 gsm.

The low density and high density regions may be arranged adjacent to each other. This arrangement of component layers in two density regions may result in a nonwoven that delivers good air filter efficiency and low pressure drop in an air filtering device. This is because the fibers are spread out through the thickness enabling more air flow pathways, resulting in less fiber to fiber contact and more available fiber surface area to capture particles. Such high and low density regions can be formed by hydroentangling the composite layers to form hollow protrusions 110 (e.g. low density regions) and recessed regions 120 (e.g. high density regions), as shown in FIG. 4. As seen in FIG. 5, the hollow protrusions 110 comprise open regions 130 that enable lower pressure drop across the substrate 10 when used in an air filtering device compared to the same material composition of a substrate without a hollow protrusion and recessed region pattern.

The fibers in the substrate 10 may have a specific surface area greater than about 50 m$^2$/g, or from about 75 m$^2$/g to about 600 m$^2$/g, or from about 100 m$^2$/g to about 400 m$^2$/g, or from about 100 m$^2$/g to about 200 m$^2$/g. The specific surface area of the substrate can be measured using the method described herein. For a 60 gsm hydroentangled material, the fibers of the component layers may have a specific surface area from about 120 m$^2$/g to about 150 m$^2$/g. Large specific surface area results in providing more surface to capture dirt particles, thereby increasing the particle capture efficiency.

The component layers may be combined with a plurality of connections between the layers to form the composite filter substrate 10. Such connections may comprise mechanical interpenetration of fibers from the first component layer 100 and second component layer 200 (which may be formed via hydroentangling, or needle-punching or sewing or any other mechanical entangling process); fusion bonds via thermal bonding, through-air bonding, pressure bonding, ultrasonic bonding, radio-frequency bonding, laser bonding; adhesion bonds via adhesives or binders; and combinations thereof.

The component layers of the invention may be combined together to form hollow protrusions 110 in a pattern that enhances the particle capture efficiency while keeping the pressure drop low when used in an air filtering device. One method of combining component layers is hydroentangling using a pattern belt or a pattern drum with open patterned regions on to which component layers are stacked during hydroentangling. Upon hydroentangling, the open regions 130 hold the fibers that form the hollow protrusions 110. Detailed methods of patterned hydroentangling are been disclosed in U.S. 2001/0029966.

Other suitable methods of forming low density hollow protrusions 110 and high density recessed regions 120 may include forming such regions in at least one of the component layers, followed by combining the component layers of the invention. One or more component layers with low and high density regions may be formed by carded or spunlaid or air-laid or wet-laid processes on a pattern belt or a drum with open patterned regions; by creping; corrugation; stretch lamination; knitting such as with cable knits or any other suitable pattern; active mechanical deformation; and combinations thereof. Suitable methods of active mechanical deformation of one or more component layers have been disclosed in U.S. Pat. No. 7,682,686 to Curro et al; U.S. 2012/0064280 to Hammons et al; and U.S. 2006/0234586 to Wong et al. Suitable methods of stretch lamination are disclosed in U.S. Pat. No. 5,143,679 to Weber et al; and U.S. Pat. No. 5,628,741 to Buell et al. Examples of creping method are disclosed in WO 1997019808 to Diaz et al; and U.S. Pat. No. 6,835,264 to Sayovitz et al. An example of a corrugation method is disclosed in U.S. Pat. No. 5,753,343 to Braun et al.

The substrate 10 may have a pore volume distribution ("PVD"), wherein at least about 15% of the total volume is in pores of radii less than about 50 μm, at least about 40% of the total volume is in pores of radii from about 50 μm to about 100 μm, and at least about 10% of the total volume is in pores of radii greater than about 200 μm. Alternatively, the PVD of the substrate 10 may be at least about 15% or about 15% of the total volume is in pores of radii less than about 50 μm; at least about 40% of the total volume is in pores of radii from about 50 μm to about 100 μm; at least about 25% of the total volume is in pores of radii from about 100 μm to about 200 μm; and less than about 15% or from about 10% to about 15% of the total volume is in pores of radii greater than about 200 μm. Alternatively, the PVD of the substrate 10 may be at least about 25% of the total volume is in pores of radii less than about 50 μm, at least about 45% or about 45% of the total volume is in pores of radii from about 50 μm to about 100 μm, and less than about 15% or about 15% of the total volume is in pores of radii from about 100 μm to about 200 μm; and less than about 10% of the total volume is in pores of radii greater than about 200 μm.

The substrate 10 may have an air flow surface area from about 0.1 m$^2$ to about 1 m$^2$ (about 1.08 ft$^2$ to about 10.76 ft$^2$), or from about 0.1 m$^2$ to about 0.6 m$^2$ (about 1.08. ft$^2$ to about 6.46 ft$^2$), or from about 0.15 m$^2$ to about 0.5 m$^2$ (about 1.61 ft$^2$ to about 5.38 ft$^2$), or from about 0.2 m$^2$ to about 0.4 m$^2$ (about 2.15 ft$^2$ to about 4.31 ft$^2$). Using a substrate with more air flow surface area may enable a lower pressure drop when used in an air filtering device. This enables a higher air flow rate (i.e. air flow in cubic feet per minute ("CFM")) from a fan for a given amount of power. Higher air flow surface area also enables a quieter device since less power is needed from a fan.

The substrate 10 may have a z-direction thickness from about 0.5 mm to about 10 mm, or from about 1 mm to about 5 mm, or from about 1 mm to about 3 mm.

The substrate 10 may optionally include treatment agents/additives to improve the particulate removal such as anti-bacterial, anti-viral, or anti-allergen agents; ionic and non-ionic surfactants; wetting agents; peroxides; ionic and non-ionic polymers; metal salts; metal and metal oxides catalysts (e.g. ZPT, Cu, Ag, Zn, ZnO); pH buffering agents; biological agents including enzymes, natural ingredients and extracts thereof; coloring agents; and perfumes. It is also contemplated that the treatment agent may include vitamins, herbal ingredients, or other therapeutic or medicinal actives for the nose, throat, and/or lungs. The substrate 10 may also include conductive materials and/or carbon particles to help remove odors and/or trap small molecules (VOC's, etc. . . . ).

The composite filter substrate 10 may improve air filtration efficiency for all particle sizes of airborne particles.

First Component Layer

The first component layer 100 (or "first layer") comprises a mixture of fibers that may be randomly distributed. The mixture of fibers can comprise fibers with different shapes (cross-sectional areas); sizes (i.e. denier); materials, and/or different chemistries. The mixture of fibers may have at least two different deniers and the same shape or at least two different deniers and at least two different shapes.

The fibers in the first component layer 100 may comprise a denier from about 0.7 dpf to about 7.0 dpf, or about 0.7 dpf to about 6.0 dpf, or about 0.7 dpf to about 4.0 dpf. The fibers may include low denier and high denier fibers. The low denier fibers may result from the decomposition of splittable fibers. For instance, splittable fibers may split into individual low denier fibers when, for example, hydroentangling or any other form of mechanical deformation of the fibrous structure. The splittable fibers may be composed of at least two threads, e.g. from 2 to 14 threads of different polymers, whether they are homopolymers, copolymers or mixtures thereof. The splitting of fibers may reduce the denier of fibers, e.g. to about one-tenth of the original denier, or even one-twentieth of the original fiber denier.

FIGS. 6A and 6B show enlarged images of fibers having different shapes and sizes in the first component layer. The low denier shaped fibers may have a denier in the range from about 0.6 dpf to about 1.2 dpf, or from about 0.7 dpf to about 1.1 dpf, or from about 0.8 dpf to about 1.1 dpf, or from about 0.8 to about 1.0 dpf, or from about 0.9 to about 1 dpf. When fibers are split into multiple threads or filaments, low denier fibers may have a denier in the range from about 0.01 dpf to about 0.5 dpf; or from about 0.05 dpf to 0.25 dpf; or from about 0.05 dpf to about 0.1 dpf. The high denier fibers may have a denier in the range from about 2.2 dpf to about 6 dpf, or from about 2.5 dpf to about 5 dpf or from about 2.8 dpf to about 4.5 dpf, or from about 2.8 dpf to about 3.0 dpf. Other fiber deniers may also be included.

Figure 7A:
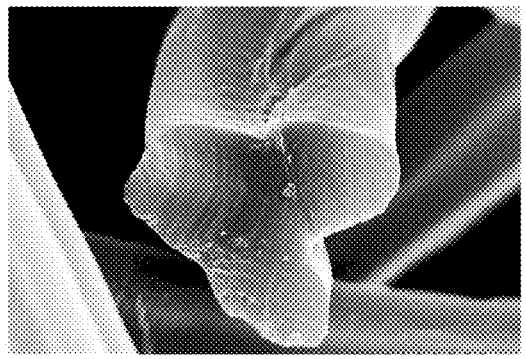
FIG. 7A is a magnified image of one embodiment of a polypropylene tri-lobal fiber.
Figure 7B:
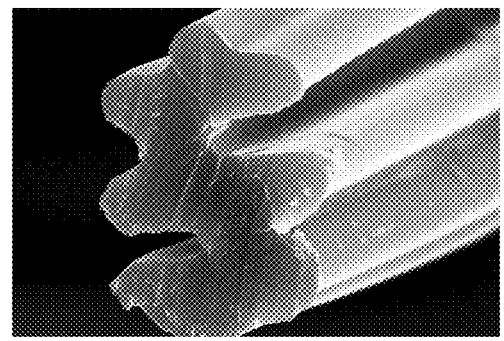
FIG. 7B is a magnified image of one embodiment of a polyester 4-deep grooved fiber.
Figure 7C:
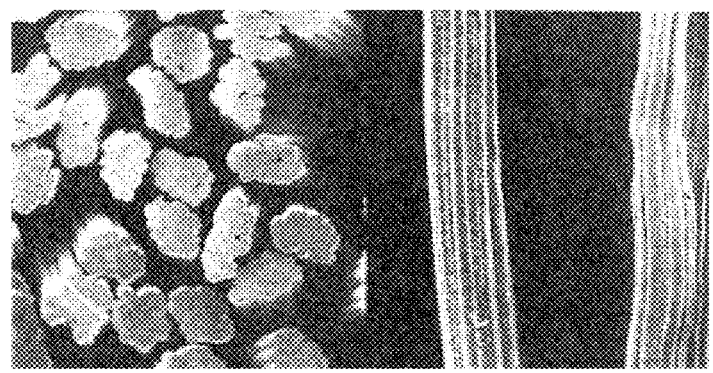
FIG. 7C is a magnified image of one embodiment of a viscose irregular shaped fiber.

The fibers may be solid or hollow. When present, a hollow region in the fiber may be singular or multiple in number. The hollow or solid fiber may be round or shaped in cross-section. The shaped fibers can be spun or created in-situ with mechanical or chemical meand or spontaneously for increasing surface area of capture. Shaped fibers may comprise various multi-lobal shapes, such as the most commonly encountered tri-lobal shaped fibers. One tri-lobal fiber having a denier of about 3.0 dpf is shown in FIG. 7A. Other multi-lobal shaped fibers include, bi-lobal, quatro-lobal shaped fibers. The shaped fibers may also include delta shaped, concave delta shaped, crescent shaped, oval shaped, star shaped, trapezoid shaped, square shaped, diamond shaped, U-shaped, H-shaped, C-shaped, V-shaped, multi-lobal deep-grooved (or deep channel) fibers such as the 6.0 dpf 4DG™ fiber shown in FIG. 7B or Winged Fibers™ with at least 32 deep channels, irregular shaped fibers such as the 1.5 dpf viscose irregular shaped fiber shown in FIG. 7C, or combinations thereof. Multi-lobal deep-grooved fibers, such as 4DG™ fibers, may be obtained from Fiber Innovation Technology, Inc. located at 398 Innovation Drive, Johnson City, Tenn., U.S.A. Similarly, Winged Fibers™ may be obtained from Allasso Industries, Morrisville, N.C., U.S.A. The shaped fibers may include any combinations of the aforementioned shaped fibers.

The fibers may also be multi-component fibers (solid or hollow) comprising more than one component polymer. Multi-component fibers, commonly bi-component fibers, may be in a side-by-side, sheath-core, segmented pie, ribbon, or islands-in-the-sea configuration. The sheath may be continuous or non-continuous around the core.

Crimped fibers may also be used, for example, for substrate resiliency and loft, increased dust loading, and/or reduced pressure drops (via easy passage of air). Crimped fibers may be planar zig-zag or helical or convolution crimp.

The low denier shaped fibers and high denier shaped fibers may have the same shape. For instance, the low denier shaped fibers and the high denier fibers may be tri-lobal shaped fibers. Alternatively, the low denier shaped fibers may be tri-lobal fibers and the high denier fibers may be round fibers. More than one size of each fiber shape can be included in the first component layer.

Examples of suitable low denier thermoplastic shaped fibers include staple tri-lobal PP fibers (0.9 dpf, 38 mm in length) comprising 1% TiO2 (w/w) as supplied by FiberVisions (7101 Alcovy Road Covington, Ga., U.S.A. 30014) or staple tri-lobal PP fibers (1.17 dpf, 38 mm) comprising 0.5% TiO2 (w/w) as supplied by FiberVisions (7101 Alcovy Road Covington, Ga., U.S.A. 30014).

Examples of suitable high denier thermoplastic fibers include staple tri-lobal PP fibers (3.0 dpf 38 mm length) with 1% TiO2 as supplied from FiberVisions (7101 Alcovy Road Covington, Ga., USA 30014) or staple round PE fiber (3.0 dpf, 38 mm) with 0.22% TiO2 as supplied from Maerkische Faser GmbH or staple Tri-lobal polyester fibers (2.5 denier, 38 mm) with 0.22% TiO2 as supplied from Maerkische Faser GmbH (Grisuten str. 13, 14727 Prenmitz, Germany) or staple 4DG™ PET fiber (6.0 dpf, 38 mm) as supplied from Fiber Innovation Technology, Inc. (398 Innovation Drive, Johnson City, Tenn., U.S.A. 37604).

The fibers in the first component layer 100 may comprise from about 25% to about 100%, or from about 50 to about 100%, or from about 65% to about 100%, or from about 65% to 75% of thermoplastic shaped fibers having a denier from about 0.7 dpf to about 7.0 dpf, or from about 0.7 dpf to about 4.0 dpf, or from about 0.9 dpf to about 3.0 dpf.

The mixture of fibers in the first component layer 100 may form a nonwoven by any known process including hydroentangling to form hollow protrusions 110 and recessed regions 120 on the first component layer 100. Such hydroentangled substrate provides hollow protrusions 110 with open regions 130 and recessed regions 120, as shown in FIG. 5. Other suitable methods of forming a nonwoven or woven material of the first component layer are described above.

Figure 8:
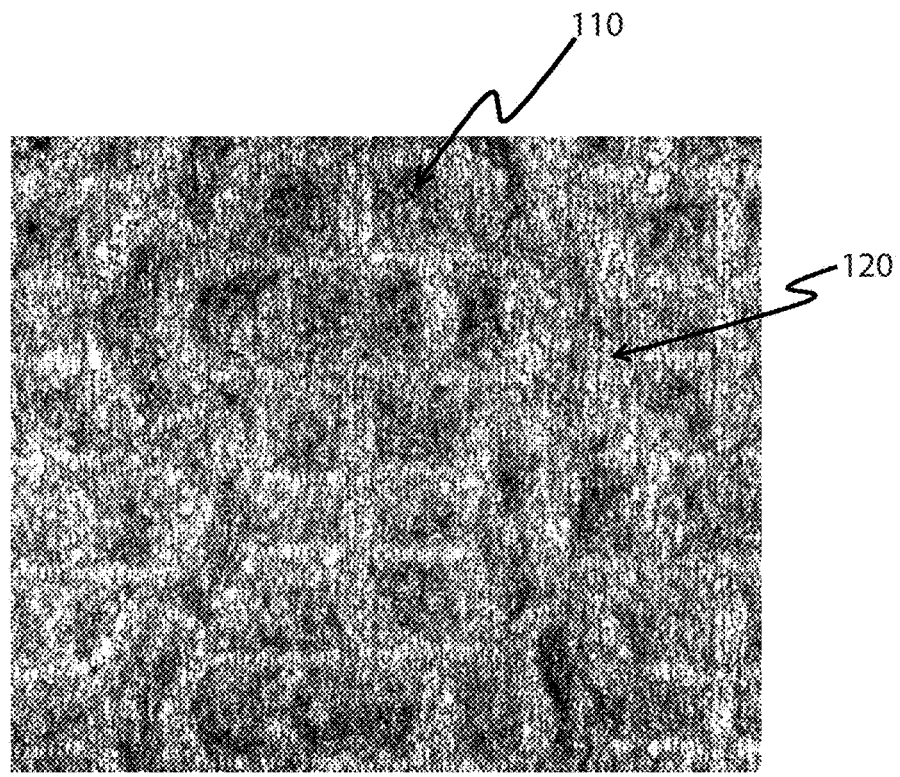
FIG. 8 is a transmission optical scanning image of the substrate shown in FIG. 4.

Now referring to FIG. 8, the hollow protrusions 110 of the first component layer 100 may form high basis weight, low density regions while the recessed regions 120 may form the low basis weight, high density regions. The hollow protrusions 110 may have a basis weight from about 1.1 times to about 5 times; or 1.1 times to about 3 times; or 1.1 times to about 2 times more than the basis weight of recessed regions 120 when basis weight of regions 110 and 120 in the first component layer are measured alone. When basis weights of regions 110 and 120 in the first component layer are measured in combination with the other component layers, the hollow protrusions 110 may have a basis weight from about 1.01 to about 1.6, or 1.05 to about 1.5, or about 1.1 to about 1.3 times more than the basis weight of recessed regions 120. The ratio of the basis weights can be measured using the method described herein.

Figure 9:
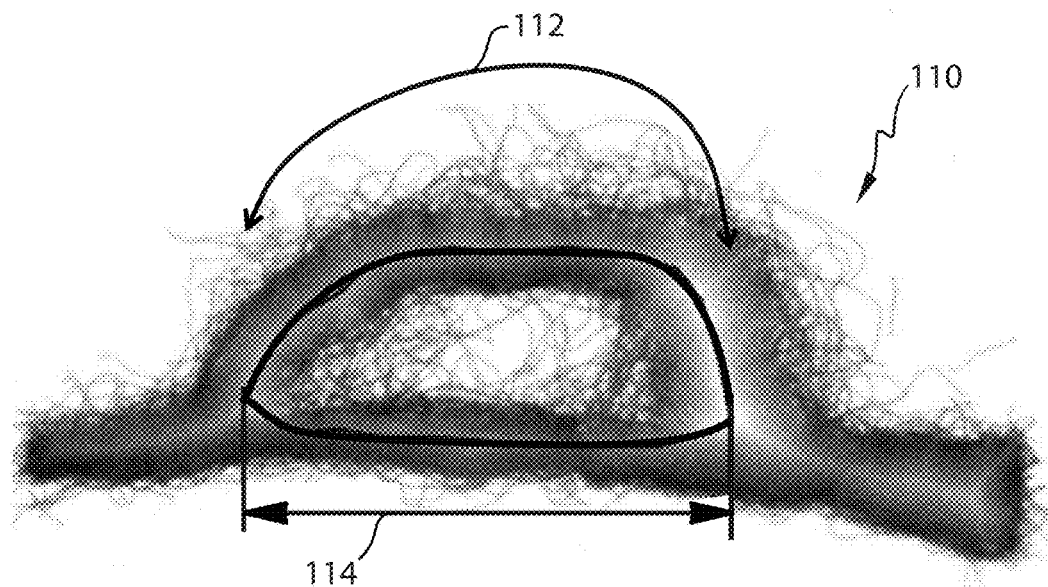
FIG. 9 is a transmission optical scanning image of a cross-section of a hollow protrusion.
Figure 11A:
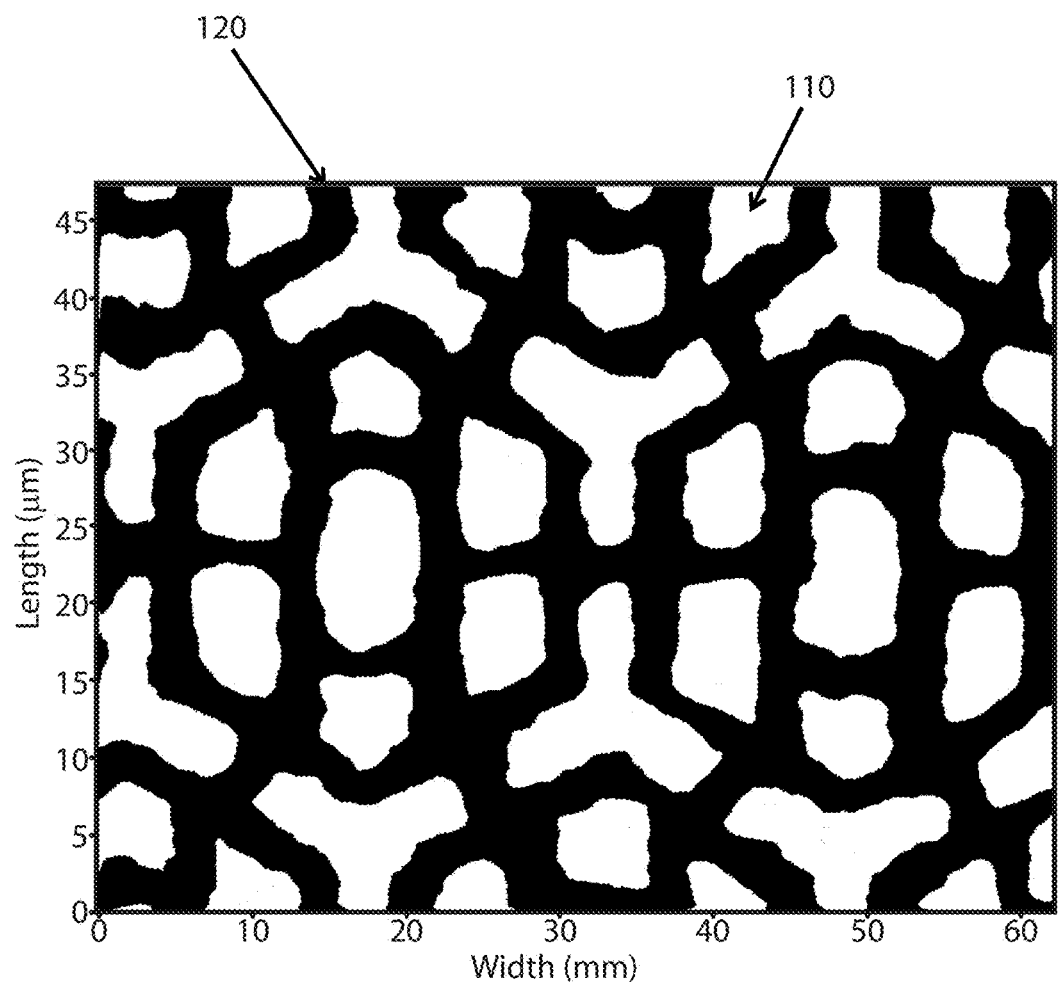
FIGS. 11A-C are binary 2D projections of 3D images (from a GFM MikroCAD optical profiler instrument) showing various embodiments of substrates having various hollow protrusion patterns, all with a planar area ratio of 50:50.
Figure 11B:
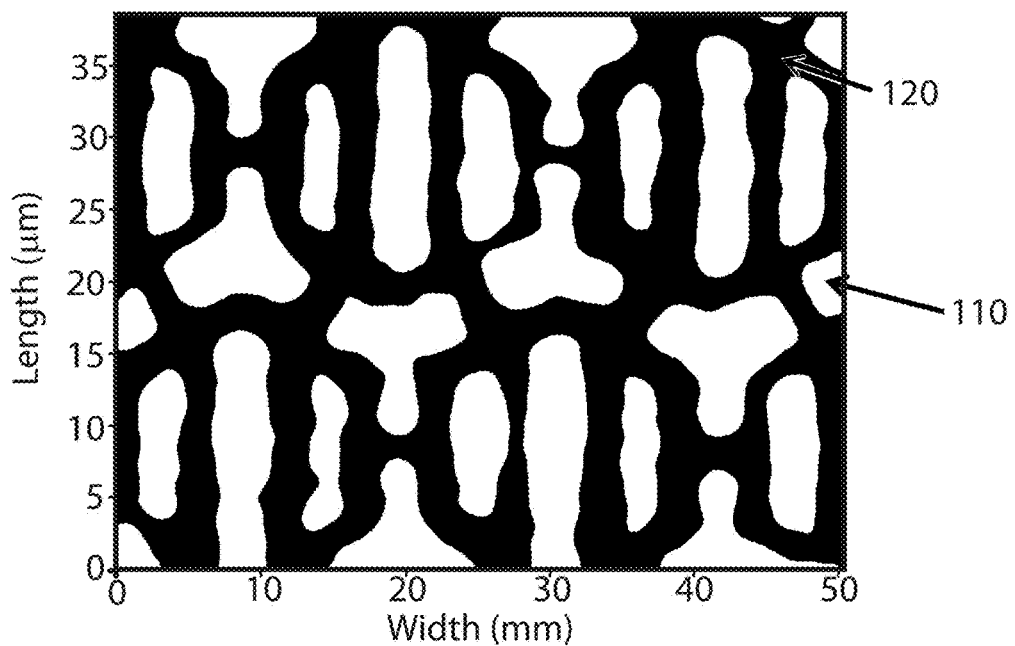
Figure 11C:
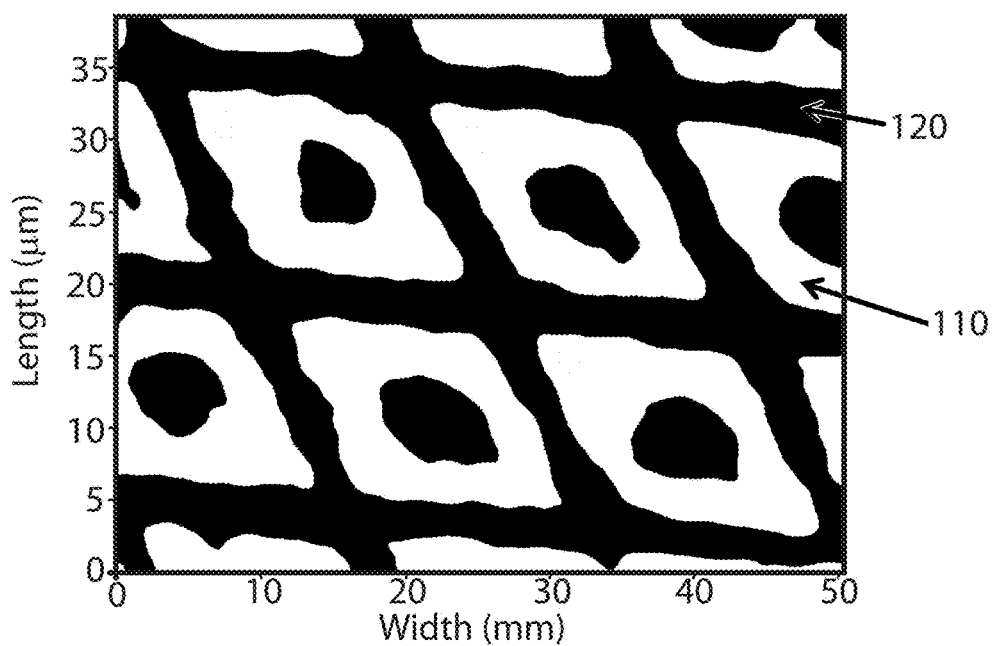

Now referring to FIG. 9, each hollow protrusion 110 comprises a protruded length 112 and a non-protruded length 114. The ratio of the protruded length to the non-protruded length is from about 98:2 to about 50:50, alternatively from about 95:5 to about 50:50, alternatively from about 80:20 to about 60:40. Hollow protrusions have a protruded length 112 from about 3 mm to about 16 mm, or from about 4 m to about 10 mm, or from about 5 mm to about 8 mm. Non-protruded length 114 may have a length from about 2 mm to about 14 mm; about 3 mm to about 9 mm; or about 4 mm to about 7 mm. In an embodiment in FIGS. 4, 5, and 9, the hollow protrusion 110 have protruded length from about 5 mm to about 7 mm, and non-protruded length from about 4.5 to about 5.5 mm.

Now referring to FIGS. 10A and 10B, each hollow protrusion 110 may have a protruded height from about 0.5 mm to about 5 mm, or from about 0.5 mm to about 3 mm, or from about 0.7 mm to about 2 mm. The hollow protrusions 110 have protruded height from about 0.8 mm to about 1.3 mm, or from about 1.0 mm to about 1.2 mm. The height of a hollow protrusion can be measured using the method described herein.

The recessed regions 120 may form a continuous pattern the X-Y dimension on one face of the substrate 10 as shown in FIG. 4. The continuous pattern may comprise narrow channels of recessed regions 120 having a width ranging from about 0.25 mm to about 10 mm, or from about 1 mm to about 8 mm, or from about 2.5 mm to about 2 mm.

The hollow protrusions 110 may be formed in patterns inside the continuous pattern of the recessed regions 120.

The planar area ratio, which is the ratio of hollow protrusions and recessed regions of the protruded face of the first layer 100 as measured under the planar area ratio test outlined herein, is about 20:80 to about 80:20, or about 30:70 to about 70:30, or about 40:60 to about 60:40, or about 40:60 to about 50:50, or about 50:50. Exemplary patterns and planar ratios are shown in FIGS. 11A-C and 12A and B.

The basis weight of the first component layer 100 may be as low as about 15 gsm to as high as 100 gsm, or from about 15 gsm to about 75 gsm, or from about 20 gsm to 60 gsm. In an embodiment, the basis weight ranges from about 30 gsm to about 40 gsm.

The Second Component Layer.

The second component layer 200 (or "second layer"; also known in the industry as the carrier web) may comprise any fiber included in the first component layer and/or other fiber types known in the art. The second component layer may comprise one size of fibers, or a mixture of at least two different sizes of fibers.

Fibers in the second component 200 layer may have a denier from about 0.0001 dpf to as high as about 10 dpf, or from about 0.0001 dpf to 7.0 dpf, or from about 0.0015 dpf to about 2.0 dpf.

The second component layer 200 may comprise nanofibers having a denier from about 0.0001 dpf to about 0.006 dpf, or from about 0.0015 dpf to about 0.005 dpf, or from about 0.0015 dpf to about 0.003 dpf, or from about 0.0015 dpf to about 0.0018 dpf. The nanofibers may have a denier less than about 0.01 dpf. For example, for PP nanofibers, the denier is generally less than about 0.0063 dpf; or for polyester nanofibers, the denier is generally less than about 0.0098 dpf; or for Nylon 6,6 nanofibers, the denier is generally less than about 0.0082 dpf. Alternatively, nanofibers with a circular or round cross-section may have a diameter up to 1 micron. A suitable method of making nanofibers is melt blowing, melt film fibrillation, electrospinning, force spinning, electroblowing, fiber splitting, islands-in-the-sea, or combinations thereof. A suitable method of making nanofibers using melt film fibrillation is described in U.S. Pat. No. 8,512,626. A suitable nanofiber is Arium® from Polymer Group, Inc. (Charlotte, N.C.).

Figures 13A, 13B:
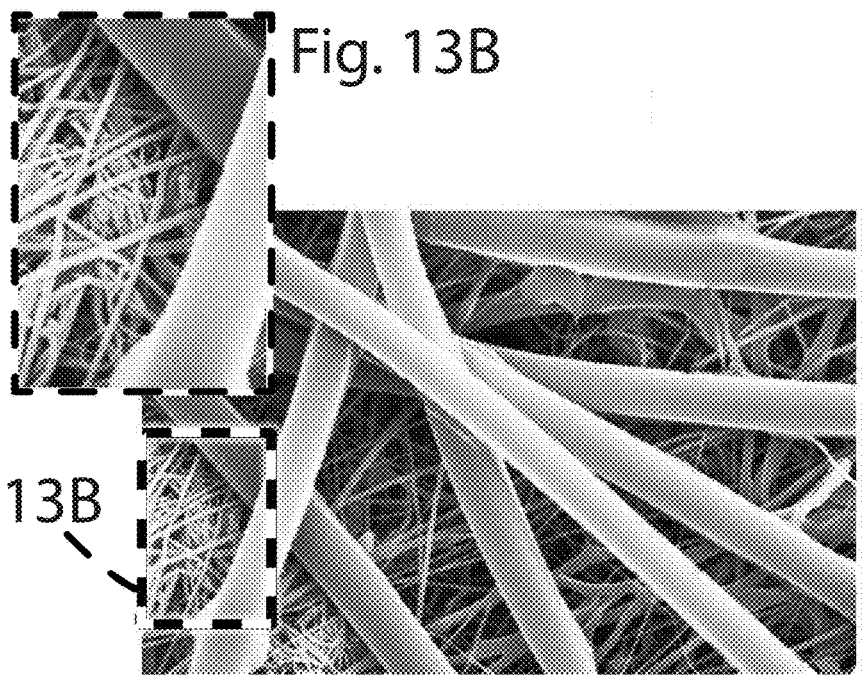
FIG. 13A is a magnified image of one embodiment of a second layer of a composite filter substrate comprising round spunbond polypropylene, round nano polypropylene, and round meltblown polypropylene fibers.
FIG. 13B is an enlarged view of the area denoted by the dashed box in 13A.

The fibers can be round or shaped fibers, such as tri-lobal, hexagonal, ribbed, ribboned, and the like, and combinations thereof. Such fibers can enhance the dust capturing capability of the substrates herein. FIGS. 13A and 13B show round and nanofibers used in the second component layer.

The second component layer may comprise at least 50% of fibers with a denier greater than 0.9 dpf, or from about 0.9 dpf to about 7.0 dpf, or about 0.9 dpf to about 3.0 dpf, or about 0.9 dpf to about 2.0 dpf. The second component layer may comprise at least 50% of fibers with any of the aforementioned deniers and at least 5% of fibers as nanofibers with a denier of less than about 0.0063 dpf, or about 0.0001 dpf to about 0.006 dpf.

Examples of multi-layer nonwoven webs suitable for use as the second component layer include: spunbond ("S"), spunbonded/meltblown/spunbonded ("SMS"), or spunbond/meltblown/nanofiber/spunbond ("SMNS") multi-layer structures, or combinations thereof. Additional nonlimiting examples of nonwoven webs suitable for use as the second component layer comprise carded such as carded thermally bonded, carded through-air bonded, carded needle-punched, carded hydroentangled, carded resin-bonded; wet-laid; air-laid; or combinations thereof. Woven materials may also be used for forming the second component layer. Suitable woven materials for the second component layer have been described above in the Composite Filter Substrates section.

The basis weight of the second component layer 200 may be as low as about 5 gsm to as high as 50 gsm, or from about 5 gsm to about 25 gsm, or from about 7.5 gsm to 20 gsm. In an embodiment, the basis weight ranges from about 10 gsm to about 15 gsm.

The second component layer 200 may be combined with the first component layer; or combined with the first component layer 100 and optionally a third component layer 300. In an embodiment, the second component layer 200 may be sandwiched between two carded layers comprising the first component layer 100 and a third component layer 300. The layers may then be hydroentangled to form the substrate 10.

A suitable method of making the second component layer as a SMNS layer is described in U.S. Pat. No. 8,716,549.

The second component layer 200 may have a density from about 80 kg/m$^3$ to about 150 kg/m$^3$, or from about 100 kg/m$^3$ to about 150 kg/m$^3$, or from about 100 kg/m$^3$ to about 130 kg/m$^3$.

In addition to the first and second component layers, the substrate may comprise additional layers that are connected to the first and/or second layers. The substrate may comprise a first, second, and third component layer in which the first and third component layers are formed from the same fiber mixture.

Methods of Filtering Particulates

The filter substrate 10 described herein can be made into any configuration for use in trapping or minimizing dust, dirt, particulates, and/or allergens on surfaces or in the air. Such use of the filter substrate includes an air filter bag configured for use in the air filtration device described in U.S. patent application Ser. No. 14/273,594, filed May 7, 2014.

Where the substrate 10 is used in an air filtering device, the substrate may be oriented such that air flow contacts the first component layer 100 before passing through the second component layer 200 and, finally, contacts additional optional layers that make up the substrate. The substrate 10 could be oriented in a reverse manner (i.e. air contacts the first component layer last) where it is desired to view the pattern created by the hollow protrusions 110 and the recessed regions 120.

Referring to FIGS. 18-22, the substrate 10 is configured into an air filter bag 450 for use with an air filtering device 410. The device 410 may include a base 420 constructed of any known material to stabilize a motorized fan 440. The base 420 may include a fan housing 430 and legs 432 supporting the fan housing and raising the fan housing from a supporting surface to facilitate air flow into an air inlet 422 when the air inlet is located an on underside of the base. The base 420, with legs 432, may be about 5 cm to about 10 cm tall and about 20 cm to about 30 cm in diameter to reduce part weight. The base 420 has an air inlet 422 on a first side 423 of the base and an air outlet 424 on a second side 425 of the base. In some embodiments, the base 420 may include grill covers 426a, 426b corresponding to the air inlet 422 and air outlet 424, and, optionally, a fan pre-filter 442 and fan cover 444 for filtering large particles (e.g. hair) to help keep the fan clean.

The base 420 may have a tapered shroud 434 with a first step 436 to enable attachment of an air filter 450 and a second step 438 for attachment of an outer sleeve 480. The second step 438 may be lower on the shroud 434 of the base 420, circumferencing the first step 436. The shroud 434 may have a diameter at the top of about 16 cm to about 25 cm, expanding downward to about 20 cm to about 30 cm.

A fan 440 is functionally attached to the base 420 such that it assists with drawing a volume of input air into the air inlet 422 of the base and out through the air outlet 424, pushing the volume of air through an air flow path 490 defined by the outer sleeve 480 and through the air filter bag 450, also located in the air flow path 490. The fan 440 may be mounted inside the base 420 between the first side 423 and the second side 425 of the base 420. In some embodiments, the fan 440 can be placed downstream of an air filter bag 450 such that a volume of air is pulled through an air filter (vs. pushed through the air filter) and the air filter cleans the air before passing over the fan 440. "Downstream", as used herein, means a position in an airflow path that is later in time from a referenced position, when measuring air flow through an air filtering device.

The fan 440 may include a fan blade and motor. The rotating fan blade may be at least about 5 cm from the surface upon which the device 410 rests to avoid a high pressure drop in urging air into the air flow path 490 and also to minimize drawing in undesirable quantities of debris (e.g. dirt/hair). The fan 440 may be activated or powered by a power source providing less than about 25 Watts, or less than about 15 Watts, or less than about 8 Watts, or less than about 6 Watts of power to the fan.

The fan 440 may be set at a predetermined speed to provide a desired air flow rate or may be set by a control having user-selected speeds. The fan 440, when activated without the air filter 450 or outer sleeve 480, may provide from about 70 to about 150 CFM, or about 85 to about 130 CFM, or about 100 to about 120 CFM, of air.

In one embodiment, an axial fan is mounted in the base 420. Where an axial fan is used, the desired axial fan blade (also called impeller) diameter can be measured from tip to tip at outer most point of the blade and may have a diameter of about 10 cm to about 25 cm, or about 15 cm to about 25 cm, or about 17 cm to about 20 cm, and is combined with an AC or DC motor, fan housing 430, and fan speed that delivers, without the air filter 450 or outer sleeve 480, about 70 to about 150 CFM, or about 85 to about 130 CFM, or about 100 to about 120 CFM, of air. Suitable axial fans include Silverstone S1803212HN available from Conrad Electronics, Orion OD180APL-12LTB available from Allied Electronics, and EBM Pabst 6212 NM available from RS Components Intl. Axial fans may be significantly quieter than centrifugal fans typically used in air filtering devices.

Referring again to FIGS. 1-3, the device 410 includes an outer sleeve 480 longitudinally extending from the base 420. The outer sleeve 480 comprises a first open end 482 into which air enters, a second open end 484 from which air exits, and an air flow path 490 therebetween. The outer sleeve 480 is releasably attached to the base 420 at the first open end 482 and, thus, in air flow communication with the air outlet 424. The outer sleeve 480 envelops the air filter 450 around its longitudinal axis LA. In this way, the direction of air flow in the air flow path 490 generally aligns with the longitudinal axis LA of the air filter bag 450 and outer sleeve 480. While the outer sleeve 480 shown in FIGS. 18-20 aligns with the longitudinal axis of the device and air filter, it is contemplated that the second open end 484 of the outer sleeve may slightly curve away from the longitudinal axis LA, wherein the second open is angled about 15 to about 30 degrees from the longitudinal axis.

The outer sleeve 480 may have a diameter at the first open end 482 and second open end 484 of about 7 cm to 25 cm, or about 7 cm to about 23 cm, or about 7 cm to about 17 cm, or about 7 cm to about 15 cm. The second open 484 end may be smaller than the first open end 82 where the outer sleeve 480 is tapered at the second end. The outer sleeve 480 may be elongate—longer along the longitudinal axis LA compared to its depth and width. The outer sleeve 480 may be longer along the longitudinal axis LA than the air filter bag 450 to assist with capturing air flow through the air filter. In one embodiment, the outer sleeve 480 may have a length about 50 cm along the longitudinal axis LA. The outer sleeve 480 may be about 1 cm to about 8 cm longer than air filter bag 450 to capture air flow exiting the air filter 450 and directing the air downstream at a velocity that will encourage full room circulation.

The outer sleeve 480 may be made of any suitable material that is substantially impermeable to air. Substantially impermeable, as used herein, means the volume of air exiting the outer sleeve at the second open end 484 is at least about 60% of the air entering the outer sleeve at the first open end 482 when the device is in use (i.e. fan is operating). In some embodiments, the outer sleeve 480 is air impermeable such that the volume of air entering the outer sleeve is equivalent to the volume of air exiting the outer sleeve. Additionally, in some embodiments, the outer sleeve 480 may be made of a flexible material, such as woven fabrics used in upholstery or outdoor furniture or umbrellas, non-wovens, polyethylene, polyvinyl chloride, acrylic, or the like, that is capable of collapsing to a generally flat configuration or to less than about 30% of its upright configuration for ease of storage and/or shipment.

It has been learned that there is some advantage of having some low level of permeability of the outer sleeve to provide air dampening. The outer sleeve 480 has between 10 and 40% of the air passing through the outer sleeve to help dampen the sounds from the fan, filter, device system.

In addition or alternatively the outer sleeve 480 may be made from a soft and flexible or collapsible fabric like material such as felt, outdoor furniture fabrics, upholstery fabrics, non-wovens and other not rigid materials that helps dampen the sound and being somewhat absorbent of vibrations. This is notably different than most air cleaning systems that use rigid injection molded plastics as the housing and means for directing air and/or sealing around filter.

In an air filtering device that provides from about 50 to about 150 CFM or about 60 to about 85 CFM of air, the filter substrate 10 may provide a pressure drop of less than about 20 Pa (0.08 inch of water), alternatively less than about 10 Pa (about 0.04 inch of water), alternatively less than about 7.5 Pa (about 0.03 inch of water). Alternatively, it may be desirable to have a pressure drop of even less than about 5 Pa (about 0.02 inch of water). The range of pressure drop may be from about 4 Pa to about 25 Pa or from about 5 Pa to about 10 Pa (about 0.02 to about 0.04 inches of water) of pressure.

When used in an air filtering device, the composite filter substrate 10 may improve air filtration efficiency for all particle sizes of airborne particles. The substrate may have a single pass filtering efficiency of greater than about 15% of E1 particles, or from about 15% to about 45% of E1 particles; about 20% to about 70% of E2 particles; and about 50% to about 90% of E3 particle, as defined by modified single pass ASHRAE Standard 52.2 method outlined herein.

TEST METHODS

A. Thickness Measurement.

Thickness is measured according to the following method that follows a modified EDANA 30.5-90 (February 1996) method.

1. Equipment set-up should include
   a. Foot Diameter: 56.4 mm (2.221 inch)
   b. Foot Area: 24.98 cm$^2$ (3.874 in$^2$)
   c. Foot Weight: 128 grams (0.28 lbs)
   d. Foot Pressure: 5.1 gram-force/cm$^2$ (0.073 psi, 0.5 kPa)
   e. Dwell time: 10 s 2. Measure at least 4 locations, ideally 10. All should be single layer and without creases. Do not smooth, iron or tension the material to remove creases. Test pieces need to be larger than the area of the pressure foot
 3. Place the uncreased sample under the pressure foot for dwell time and measure thickness in mm
 4. Report the numerical average for all test pieces.

B. Specific Surface Area

Specific surface area is the surface area of fibers per unit mass of fibers of the substrate. It is measured using ASTM D3663-03(2008) Standard Test Method for Surface Area of Catalysts and Catalyst Carriers, wherein 100° C. degassing temperature is used instead of 300° C. Suitable instrument for specific surface area measurement is "ASAP 2020-Physisorption Analyzer", available from Micromeritics Instrument Corporation, Norcross, Ga. U.S.A. Specific surface area result is obtained as square meter per gram ($m^2/g$).

C. Cumulative Pore Volume.
 1. The following test method is conducted on samples that have been conditioned at a temperature of 23° C.±2.0° C. and a relative humidity of 45%±10% for a minimum of 12 hours prior to the test. All tests are conducted under the same environmental conditions and in such conditioned room. Discard any damaged product. Do not test samples that have defects such as wrinkles, tears, holes, and like. All instruments are calibrated according to manufacturer's specifications. Samples conditioned as described herein are considered dry samples (such as "dry fibrous sheet") for purposes of this invention. At least four samples are measured for any given material being tested, and the results from those four replicates are averaged to give the final reported value. Each of the four replicate samples has dimensions of 55 mm×55 mm
 2. Pore volume measurements are made on a TRI/Autoporosimeter (Textile Research Institute ("TRI")/Princeton Inc. of Princeton, N.J., U.S.A.). The TRI/Autoporosimeter is an automated computer-controlled instrument for measuring pore volume distributions in porous materials (e.g., the volumes of different size pores within the range from 1 to 1000 μm effective pore radii). Computer programs such as Automated Instrument Software Releases 2000.1 or 2003.1/2005.1; or Data Treatment Software Release 2000.1 (available from TRI Princeton Inc.), and spreadsheet programs are used to capture and analyze the measured data. More information on the TRI/Autoporosimeter, its operation and data treatments can be found in the paper: "Liquid Porosimetry: New Methodology and Applications" by B. Miller and I. Tyomkin published in 10 Journal of Colloid and Interface Science (1994), volume 162, pages 163-170.
 3. As used herein, porosimetry involves recording the increment of liquid that enters or leaves a porous material as the surrounding air pressure changes. A sample in the test chamber is exposed to precisely controlled changes in air pressure. As the air pressure increases or decreases, different size pore groups drain or absorb liquid. Pore-size distribution or pore volume distribution can further be determined as the distribution of the volume of uptake of each pore-size group, as measured by the instrument at the corresponding pressure. The pore volume of each group is equal to this amount of liquid, as measured by the instrument at the corresponding air pressure. Total cumulative fluid uptake is determined as the total cumulative volume of fluid absorbed. The effective radius of a pore is related to the pressure differential by the relationship:
 4. Pressure differential=$[(2) \gamma \cos \Theta]$/effective radius where $\gamma$=liquid surface tension, and $\Theta$=contact angle.
 5. This method uses the above equation to calculate effective pore radii based on the constants and equipment controlled pressures. The automated equipment operates by changing the test chamber air pressure in user specified increments, either by decreasing pressure (increasing pore size) to absorb liquid, or increasing pressure (decreasing pore size) to drain liquid. The liquid volume absorbed or drained at each pressure increment is the cumulative volume for the group of all pores between the preceding pressure setting and the current setting. The TRI/Autoporosimeter reports the pore volume contribution to the total pore volume of the specimen, and also reports the volume and weight at given pressures and effective radii. Pressure-volume curves can be constructed directly from these data and the curves are also commonly used to describe or characterize the porous media.
 6. In this application of the TRI/Autoporosimeter, the liquid is a 0.2 weight % solution of octylphenoxy polyethoxy ethanol (Triton X-100 from Union Carbide Chemical and Plastics Co. of Danbury, Conn.) in 99.8 weight % distilled water (specific gravity of solution is about 1.0). The instrument calculation constants are as follows: $\rho$(density)=1 g/cm3; $\gamma$ (surface tension)=31 dynes/cm; $\cos \Theta$=1. A 1.2 μm Millipore Mixed Cellulose Esters Membrane (Millipore Corporation of Bedford, Mass.; Catalog # RAWP09025) is employed on the test chamber's porous plate. A plexiglass plate weighing about 32 g (supplied with the instrument) is placed on the sample to ensure the sample rests flat on the Millipore Filter. No additional weight is placed on the sample.
 7. A blank condition (no sample between plexiglass plate and Millipore Filter) is run to account for any surface and/or edge effects within the test chamber. Any pore volume measured for this blank run is subtracted from the applicable pore grouping of the test sample. For the test samples, a 4 cm×4 cm plexiglass plate weighing about 32 g (supplied with the instrument) is placed on the sample to ensure the sample rests flat on the Millipore filter during measurement.
 8. No additional weight is placed on the sample. The sequence of pore sizes (pressures) for this application is as follows (effective pore radius in μm): 10, 20, 30, 40, 50, 60, 70, 80, 90, 100, 120, 140, 160, 180, 200, 220, 240, 260, 280, 300, 350, 400, 450, 500, 550, 600, 650, 700, 750, 800. These pressure values are used to produce the Advancing 1 and Receding 1 curves. This sequence starts with the sample dry, saturates it as the pressure decreases (i.e., Advancing 1 curve), and then subsequently drains the fluid out as the pressure increases again (i.e., Receding 1 curve).
 9. The TRI/Autoporosimeter measures the cumulative weight (mg) of liquid at each pressure level, and reports the respective cumulative pore volume of the sample. From these data and the weight of the original dry sample, the ratio of cumulative pore volume/sample weight can be calculated at any measured pressure level, and reported in $mm^3$/mg. In the case of this test method, the respective cumulative pore volume is determined during the Receding 1 curve, and is reported in $mm^3$/mg and taken from the TRI instrument.

D. Protruded Height & Planar Area Ratio 1. 3D Image Capture

Protruded height and planar area ratios are measured from the substrate height images captured using an Optical 3D Measuring System MikroCAD Compact instrument (the "GFM MikroCAD optical profiler instrument") and ODSCAD Version 6.3 Rev. 2 software available from GFMesstechnik ("GFM") GmbH, Warthestraβe E21, D14513 Teltow, Berlin, Germany. The GFM MikroCAD optical profiler instrument includes a compact optical measuring sensor based on digital micro-mirror projection, consisting of the following components:

- a. A Texas Instruments DMD™ projector with 1024×768 direct digital controlled micro-mirrors.
- b. Basler A641f CCD camera with high resolution (1624×1236 pixels).
- c. Projection optics adapted to a measuring area of at least 50×38 mm.
- d. Schott KL1500 LCD cold light source.
- e. Table and tripod based on a small hard stone plate.
- f. Measuring, control and evaluation computer.
- g. Measuring, control and evaluation software ODSCAD 6.3 Rev. 2.
- h. Adjusting probes for lateral (x-y) and vertical (z) calibration.

The GFM MikroCAD optical profiler system measures the height of a sample using the digital micro-mirror pattern projection technique. The result of the analysis is a map of surface height (z) versus x-y displacement. The system should provide a field of view of 50×38 mm with a resolution of 21 μm per pixel in the x-y field of view. The height resolution is set to about 0.5 μm/count. The height range is 65,400 times the resolution. To measure a fibrous structure sample, the following steps are utilized.

- i. Turn on the cold-light source. The settings on the cold-light source are set to provide a reading of at least 2,800 k on the display.
- j. Turn on the computer, monitor, and printer, and open the software.
- k. Select "Start Measuring Program" icon from the ODSCAD task bar and then click the "Live Image" button.
- l. Obtain a fibrous structure sample that is larger than the equipment field of view. Place the sample under the camera such that the sample's planar surface is parallel to the front face of the lens, and the sample must completely fill the 50×38 mm field of view. The sample should be laid as flat as possible without stretching or compressing the sample within the field of view. The sample must not be compressed under a glass plate. The sample may be held down on the edges without stretching with weights or adhesives (e.g. tape) outside the field of view.
- m. Adjust the distance between the sample and the projection head for best focus in the following manner. Turn on the "Show Cross" button. A blue cross should appear on the screen. Click the "Pattern" button repeatedly to project one of the several focusing patterns to aid in achieving the best focus. Select a pattern with a cross hair such as the one with the square. Adjust the focus control until the cross hair is aligned with the blue "cross" on the screen.
- n. Adjust image brightness by changing the aperture on the lens through the hole in the side of the projector head and/or altering the camera gains setting on the screen. When the illumination is optimum, the red circle at the bottom of the screen labeled "I.O." will turn green. Click the "Measurement" button to capture 3D height image.
- o. Save the 3D height and camera images (as Fringe Files *.omc and *.kam, respectively) from the File Menu for protruded height and planar area ratio measurements and calculations 2. Protruded Height Measurements and Calculations Based on 3D Image This method uses the 3D image captured by the method outlined above in Section 1. The 3D image processing is done in ODSCAD software followed by calculations and statistical analysis using "R" statistical software package version 3.1.1 available as Free Software under the terms of the Free Software Foundation's GNU General Public License in source code form (R: A Language and Environment for Statistical Computing, R Foundation for Statistical Computing, Vienna, Austria). The software can be downloaded from http://www.r-project.org.

Figure 14:
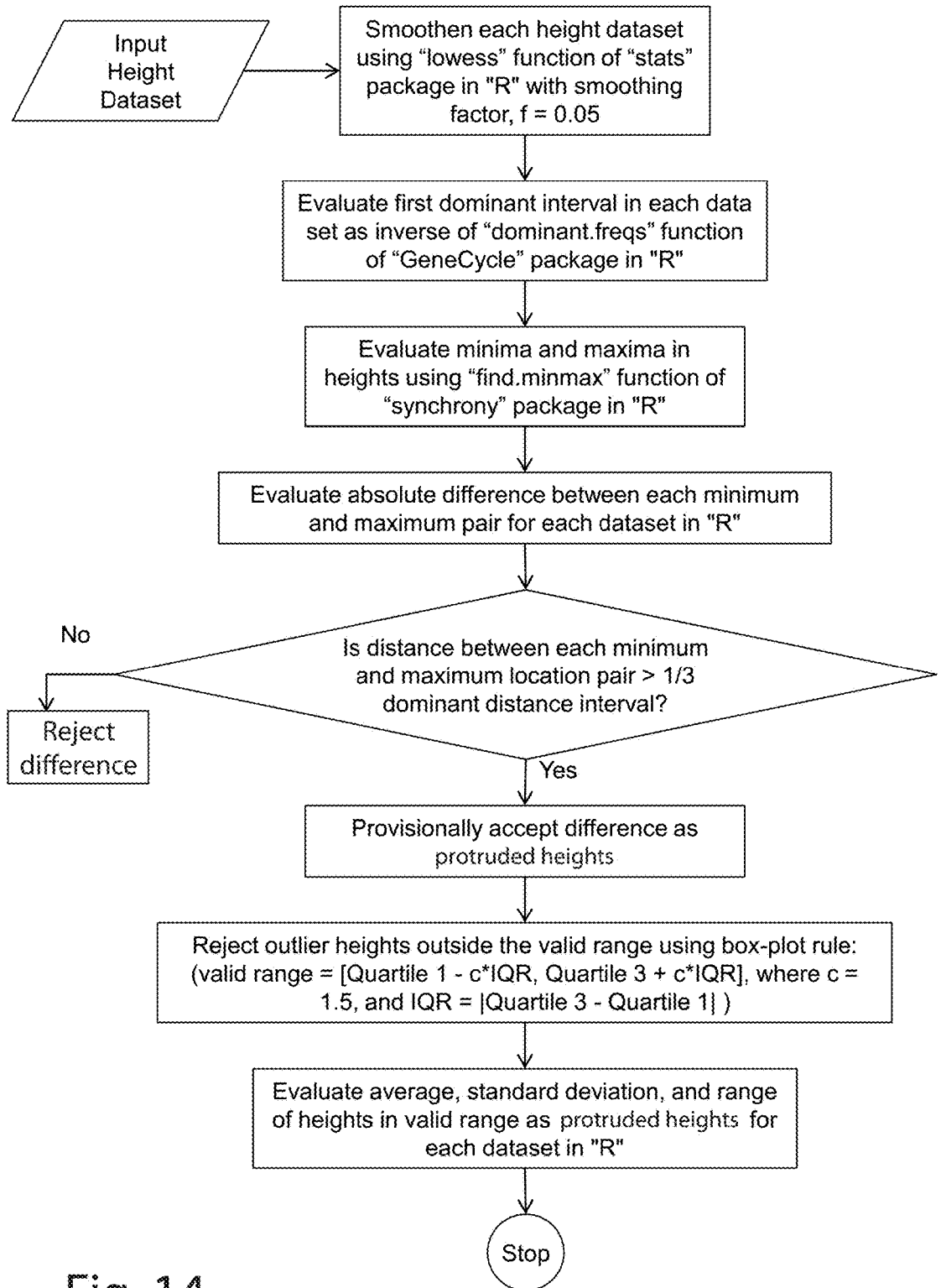
FIG. 14 is a flow chart to calculate protruded height of a hollow protrusion.

- a. Open the 3D height image (file-type .OMC) of the substrate from the File Menu in the ODSCAD software.
- b. From the Filter Menu, click on "Remove Invalid" to remove any out of focus areas from the measurements. Use the following Settings: Radius limit in pixel=99; Check or select the boxes for the following three options: "Remove invalid areas with contact to picture edge"; and "Replace invalid areas through neighbors from X+Y direction".
- c. From the Filter Menu, click on "Average Filter" to smoothen the protruding singular fibers from the height image. Choose a Mask of 25 pixels in both X and Y directions, and select X+Y direction box for the whole image area.
- d. From the Evaluate Menu, click on "Surface Minimum, Maximum" to measure and record original Minimum Height in microns (μm) prior to further filtering.
- e. From the Filter Menu, click on "Polynomial Filter Material Part" to remove any large-scale background undulations or curvature in the overall substrate. These background curvatures or undulations could occur when the substrate is not laid down exactly flat while taking the height images with the GFM MikroCAD optical profiler instrument. The background undulations and curvatures are typically much larger in area than the protrusion regions. Choose a polynomial of Rank 5, and exclude 0.1% each of peaks and valleys in 2 cycles, and select "Polynomial on entire profile" with a Factor of 1.0. Click on "Calculate" button to evaluate polynomial filter coefficients. The polynomial filter representing background undulations in the height image would be shown on top left, and filtered image would be shown on bottom left. Click on "Difference" button to filter the background undulations and curvature from the height image.
- f. From the Evaluate Menu, click on "Surface Minimum, Maximum" to measure and record Minimum Height in microns (μm) after the polynomial filter correction.
- g. Scale the height of the image by assuming minimum height of the substrate to be constant before and after removing background curvature and undulations in the substrate using polynomial filter in the Step e above. This is done by choosing "New Scaling" in the Edit Menu. Subtract Minimum Height from Step f from the original Minimum Height from Step d. Enter the result in (mm) in the box C.

h. From the Evaluate Menu, click on "Surface Minimum, Maximum" to evaluate minimum and maximum heights. The Minimum Height evaluated in this step will now be the same as the original Minimum Height from the Step d.
i. From the Mark Menu, select "Draw Line" tool, and draw three or four different straight lines that each start from the center of a randomly selected protrusion and extend in the x-direction, as shown in FIG. 10A, through the center of a recessed area and the center of an another adjacent protrusion and so on. While FIG. 10A shows these lines drawn in the x-direction, the lines can be drawn in the y-direction. From the View Menu, click on the icon "Show Sectional Line Diagram" to view the height vs. distance charts for different lines as shown in FIG. 10B. Save the height profile data as ASCII data to analyze protruded heights from the sectioned lines by clicking on "Export Data" in File Menu.
j. Calculate average and standard deviation of protruded heights for each sample using a subroutine shown in the flowchart in FIG. 14. The subroutine can be executed in "R" statistical software package version 3.1.1 as mentioned above. The library packages mentioned in the flowchart can be added as plugins from within base "R" software using Package Installer utilizing CRAN (Comprehensive R Archive Network) repositories. For the "stats" package, version used is 3.1.1; for "GeneCycle" package, version used is 1.1.2 developed by Konstantinos Fokianos; for "synchrony" package, version used is 0.2.3 developed by Tarik C. Gouhier. The Package Installer and the CRAN repositories for the plugins and library packages are available from the R Foundation for Statistical Computing, Institute for Statistics and Mathematics, Wirtschaftsuniversität Wien, Welthandelsplatz 1, 1020 Vienna, Austria. Alternatively, the R software can be downloaded from http://www.r-project.org.
k. To measure height of hollow protrusions, an average of maxima values (evaluated from "find.minmax" function, as shown in the flowchart in FIG. 14) is taken after removing the outliers with box-plot rule indicated in the flowchart. Similarly, to measure the height of recessed areas, an average of minima values is taken after removing the outliers with box-plot rule indicated in the flowchart in FIG. 14.

3. Planar Area Ratio Measurements and Calculations Based on the 3D Images

This method uses the 3D image captured by the method outlined above in Section 1. The 3D image processing and planar area ratio calculations are done in ODSCAD software.

a. Open the 3D height image (file-type .OMC) of the substrate from the File Menu in the ODSCAD software.
b. From the Settings Menu, click on "Set Colour Table". Select Gray Scale with minimum height represented by Black, maximum height represented by White, and intermediate heights represented by shades of Gray in continuous manner.
c. From the Filter Menu, click on "Remove Invalid" to remove any out of focus areas from the measurements. Use the following Settings: Radius limit in pixel=99; Check or select the boxes for the following two options "Remove invalid areas with contact to picture edge" and "Replace invalid areas through neighbors from X+Y direction.
d. From the Filter Menu, click on "Fourier Filter" to filter out fine-scale features such as fibers, and keep the macro-texture represented by protrusions and recessed areas. Choose a cut-off wavelength of about 20 pixels (corresponding to an actual distance of about 0.75 mm, or approximately less than half the smallest texture feature size). Features smaller than the cut-off wavelength would be filtered out from the image. Choose "Wave Filter" selection, and deselect "Fine Structure as Result". Choose 2 "Filter Repetitions". Apply the filter to the whole 3D image.
e. From the Filter Menu, click on "Polynomial Filter Material Part" to remove any large-scale background undulations or curvature in the overall substrate. These background curvatures or undulations could be occur when the substrate is not laid down exactly flat while taking the height images with the GFM MikroCAD optical profiler instrument. The background undulations and curvatures are typically much larger in area than the protrusion regions. Choose a polynomial of Rank 5, and exclude 0.1% each of peaks and valleys in 2 cycles, and select "Polynomial on entire profile" with a Factor of 1.0. Click on "Calculate" button to evaluate polynomial filter coefficients. The polynomial filter representing background undulations in the height image would be shown on top left, and filtered image would be shown on bottom left. Click on "Difference" button to filter the background undulations and curvature from the height image.
f. From the View Menu, click on "Colour Coding". Set "Cut1" to be 0.000 while keeping "Max", "Min", and "Cut2" as default. Note down Area percentages in Gray (recessed regions) and White (hollow protrusions). These area percentages correspond to Planar Area Ratios. The ratio of Gray-to-White area percentages is equal to the recessed-to-hollow protrusions area ratio, which is the Planar Area Ratio.
g. Repeat Steps a-f for at least 3 sample images and then calculate and report the average of the Planar Area Ratios.

E. Protruded Length Measurement

Protruded length is measured by using image processing and analysis methods. Images of the specimen are taken using an optical transmission scanner capable of a scanning resolution of at least 1200 dots per inch ("dpi"). One such scanner is Canon® CanoScan™ 8800F available from Canon U.S.A., Inc., Melville, N.Y., U.S.A. Images can be captured from the scanner using a computer having an image capture software such as Canon® MP Navigator EX 4.0 software available from Canon U.S.A., Inc. Image processing and analysis is done using ImageJ version 1.48 or greater, available under public domain license from National Institutes of Health, Bethesda, Md., U.S.A., and can be downloaded freely from http://rsb.info.nih.gov.

1. Slice a small section about 2 mm in width of the filter substrate across at least one protrusion (as shown line 5-5 in FIG. 4) through the substrate thickness using a sharp knife or a pair of scissors while making sure that the protrusion does not collapse.
2. Hold one edge of the sliced substrate sample delicately using tweezers while taking care that sample does not damage, and place it edge down on a transmission scanner flat-bed to obtain an image similar to that schematic shown in FIG. 3.
3. Scan the image in transmission mode at a resolution of at least 1200 dpi by turning off all automatic image adjustment settings in MP Navigator EX software. Save the image as a TIF image on the computer.
4. Open the image of the specimen in ImageJ software from the File Menu. From the Analyze Menu, open the "Select Scale" dialog. Set the "Distance in pixels" to be 1200 or scanned image resolution in dpi; "Known Distance" to be 25,400; "Pixel Aspect Ratio" to be 1.0; and "Unit of Length" to be "microns".
5. From the Image Menu, click on "Duplicate . . . " to make a copy of the image. Select the image copy. Apply Steps 6 through 9 on the image copy.
6. From the Process Menu, click on "Filters" and then "Gaussian Blur . . . " selection. Select 50 microns (μm) radius, and check box on "Scaled Units" in the "Gaussian Blur" dialog box. This would smoothen the image to remove any fine scale (less than 50 μm) noise and defects.
7. From the Process Menu, click on "Enhance Contrast" to equalize the histogram for removing any lighting defects. In the "Enhance Contrast" dialog box, select "Equalize Histogram" box and enter 0.4% in the "Saturated Pixels" text box.
8. From the Process Menu, click on "Binary" sub-menu, and then "Make Binary" selection. This would convert the image into pure black and white with fibrous region as black and background as white. Then, from the Process Menu, click on "Binary" sub-menu, and then "Erode" selection. Repeat 1-2 times to make sure any stray black pixels not belonging to fibrous region are removed.
9. From the Process Menu, click on "Binary" sub-menu, and then "Distance Map" selection.
10. From the Process Menu, click on "Image Calculator . . . " function. Select original image as "Image 1" and image copy as "Image 2". Select "Difference" as the operation to overlay Distance Map of image copy from Step "5" on the original image. The Distance Map, when overlaid on the original protrusion slice image, provides the guiding lines passing through middle of the substrate thickness and protrusion thickness. These guiding lines are then traced to measure the length of the protrusion relative to its base.
11. Select Line Tool from the toolbar. Right-click on the Line Tool to select "Segmented Line". Trace the guiding line passing through the thickness of protrusion. Click on "Add Selection" from the "Overlay" sub-menu in the Image Menu. Then, click on "Measure" function in the Analyze Menu to get the length of the protrusion.
12. Repeat Step 11 for the base of the protrusion to measure its length. Upon tracing lines over the guiding lines, the image should appear similar to that in FIG. 9. Take the ratio of the protruded length and its base length.
13. Repeat Steps 1-12 for additional 5 specimens to measure ratios of protruded-to-base length.

F. Basis Weight Ratio

Basis weights can be calculated from transmission scanned images of substrate using Beer-Lambert law, according to which light transmitted through the substrate is given by:

$$\text{Transmitted Light, } I = I_0 e^{-\mu \rho L} \quad (1)$$

where, $I_0$ is incident light, $\mu$ is the mass-absorption coefficient, L is thickness of the substrate, and $\rho$ is density of the substrate. Since $\mu L$ is mass per unit area or basis weight (B), Equation (1) is modified as:

$$I = I_0 e^{-\mu B} \quad (2)$$

Upon re-arrangement, Equation (2) becomes, $$B = \frac{1}{\mu} \ln\left(\frac{I_0}{I}\right) \quad (3)$$

Equation 3 provides basis weight of substrate at any location based on given incident light $I_0$, transmitted light I, and the mass absorption coefficient $\mu$. Transmitted light and incident light is measured from the transmission scanner with and without substrate, respectively. However, the mass absorption coefficient $\mu$ may not be readily measurable or available. Therefore, basis weights of different regions (e.g., of regions A and B) of the same substrate imaged together is evaluated:

$$\frac{B_A}{B_B} = \frac{\ln(I_0/I_A)}{\ln(I_0/I_B)} \quad (4)$$

Now, at any planar location of the substrate, basis weight is a combination of a first component layer, a second component layer, and any supporting layers. So, basis weight of first component layer ($B_1$) is calculated by subtracting basis weights of second component layer and any support layer ($B_{2+s}$) from the total basis weight ($B_t$).

$$B_1 = B_t - B_{2+s} \quad (5)$$

Now, modifying Equation (5) based on Equation (3), $$B_1 = \frac{1}{\mu}\ln\left(\frac{I_0}{I_t}\right) - \frac{1}{\mu}\ln\left(\frac{I_0}{I_{2+s}}\right) \quad (6)$$

where $I_{2+s}$ is intensity of light transmitted through second component layer and any support layer, $I_t$ is intensity of light transmitted through the whole substrate.

Upon re-arranging Equation (6)

$$B_1 = \frac{1}{\mu}\ln\left(\frac{I_{2+s}}{I_t}\right) \quad (7)$$

Using Equations (4) and (7), basis-weight-ratio of high and low basis weight regions of the first component layer is defined as $$\frac{B_{1,high}}{B_{1,low}} = \frac{\ln(I_{2+s}/I_{t,high})}{\ln(I_{2+s}/I_{t,low})} \quad (8)$$

where subscripts high and low correspond to high and low basis weight regions of the first component layers, respectively.

Thus, for evaluating basis weight ratio of the high and low basis weight regions, only three intensities of light need to be measured: light transmitted through the whole substrate in high and low basis weight regions of the first component layer, $I_{t,high}$ and $I_{t,low}$ respectively, and light transmitted through the second component layer and any support layer, $I_{2+s}$.

Based on Equation (8), the following test method evaluates ratio of basis weights of hollow protrusions and recessed regions of the first component layer. Image analysis is employed to evaluate the above-mentioned light intensities: light transmitted through the whole substrate in high and low basis weight regions of the first component layer, $I_{t,high}$ and $I_{t,low}$ respectively, and light transmitted through the second component layer and any support layer, $I_{2+s}$. Images of the specimen are taken using an optical transmission scanner capable of a scanning resolution of at least 300 dpi (dots per inch), and 16-bit dynamic range for scanning and saving images. One such scanner is Canon® CanoScan™ 8800F available from Canon U.S.A., Inc., Melville, N.Y., U.S.A. Images can be captured from the scanner using a computer having a 16-bit image capture software such as Adobe Photoshop CS5 version 12.0.4 software available from Adobe Systems, Inc, and TWAIN scanner driver included in Adobe Photoshop CS5. Image processing and analysis is done using ImageJ version 1.48 or greater available under Public Domain license from National Institutes of Health, Bethesda, Md., U.S.A., and can be downloaded freely from http://rsb.info.nih.gov.

Sample Preparation:

Take a sample of at least 4 inch×8 inch area. Carefully cut and remove hollow protrusions (using sharp blade or a pair of scissors) from a few areas of the first component layer to expose the top of second component layer beneath the first component layer. Light transmitted from the areas where hollow protrusions have been removed would provide light transmitted through the second component layer and any support layer, $I_{2+s}$.

Image Capture:

In the Adobe Photoshop CS5 software, initiate the scan through the Import sub-menu of the File Menu. Scan the image in transmission mode at a resolution of 300 dpi with dynamic range set at 16-bit, and turning off all automatic image adjustment settings in scanner driver. Save the image as a TIF image on the computer.

Image Processing:

a. Open the image of the specimen in ImageJ software from the File Menu.

From the Analyze Menu, open the "Select Scale" dialog. Set the "Distance in pixels" to be 300 or scanned image resolution in dpi; "Known Distance" to be 25.4; "Pixel Aspect Ratio" to be 1.0; and "Unit of Length" to be "mm"

b. Convert the image to 32-bit grayscale from the Type sub-menu in the Image Menu.

c. From the Process Menu, click on "Filters" and then "Gaussian Blur . . . " selection. Select 0.25 mm radius, and check box on "Scaled Units" in the "Gaussian Blur" dialog box. This would smoothen the image to remove any fine scale (less than 0.25 mm) noise and defects.

Image Analysis d. From the Analyze Menu, click on "Set Measurements . . . " function to select type of measurements. Select "Mean Gray Value" measurement. This measurement would provide intensity of transmitted light.

e. First, intensity of light transmitted through the second component layer+any support layer is measured ($I_{2+s}$). For this measurement, select the "Oval" tool from the toolbar. While holding the shift key on the keyboard, draw a circular selection of about 2 mm diameter in regions where protrusions have been removed: these regions would be lighter than the rest of the regions. Click on "Add Selection" from the "Overlay" sub-menu in the Image Menu. Then, click on "Measure" function in the Analyze Menu to get mean gray value representing light transmitted through the second component layer and any support layer, $I_{2+s}$ in the selected circular region. Repeat this step by drawing circular selections about 2 mm in diameter to obtain mean gray value from the rest of regions where protrusions have been removed. Take average value of all measured mean gray values from the circular selections to obtain overall average $I_{2+s}$. Note down this value for this specimen.

f. Next, select high and low basis weight regions in the first component layer for measuring light transmitted through whole substrate in those regions: $I_{t,high}$ and $I_{t,low}$ respectively. For this purpose, choose "Rectangular" selection tool from the toolbar. Draw a rectangular selection about 1 mm×3 mm in high basis weight darkest regions. Click on "Add Selection" from the "Overlay" sub-menu in the Image Menu. Next, draw another rectangular selection about 1 mm×3 mm in low basis weight lighter region adjacent to the dark high basis weight region previously selected. Click on "Add Selection" from the "Overlay" sub-menu in the Image Menu. Repeat rectangular selection process for at least 10 pairs of high and low basis weight regions adjacent to each other. Transfer the Overlay selections to ROI Manager (regions of interest) by clicking on "To ROI Manager" from the "Overlay" sub-menu in the Image Menu.

g. To evaluate basis weight ratio defined in the Equation (8), image intensities (gray-scale values) are modified using "Macro . . . " function in "Math" sub-menu in the Process Menu. For this calculation, overall average $I_{2+s}$ from Step "e" is needed. In the "Macro . . . " function's "Expression Evaluator" dialog box, set "Code" as "v=log($I_{2+s}$/v)", where numerical value of $I_{2+s}$ from Step "e" is entered for the variable in this expression. Click "Ok" to apply the expression to the image.

h. Open "ROI Manager" window from Window Menu. Select the overlays transferred into ROI Manager from Step "f", and click on "Measure" button. Results of Mean intensity values representing numerator and denominator in Equation (8) from high and low basis weight regions, respectively are displayed in the Results Window. Basis weight ratio of high and low basis weight regions of the first component layer are calculated from the obtained results.

G. Density

1. Density of Composite Substrate

Density of the composite substrate is calculated by dividing basis weight of the composite by its thickness in z-direction. Basis weight of the composite substrate is measured by EDANA WSP 130.1.R4 (12) Standard Test Method for Mass per unit Area of nonwovens. Thickness of the substrate is measured by the Thickness Measurement method described above in Section (A) of the Test Methods herein. Measured basis weight is divided by the thickness to obtain average density of the composite substrate.

2. Densities of Low and High Density Regions of the Composite Substrate

Density of local regions of the composite substrate as in first low density region (hollow protrusions) and a second high density region (recessed region) is calculated by dividing basis weight of the local region of the substrate by the thickness of the local region of the substrate in z-direction. Since the local regions of the substrate, such as hollow protrusions and recessed regions are very small, standard test methods of measuring basis weight and thickness (as outlined above) are not applicable. The local high and low density regions have to be cut out from the substrate to measure basis weight, while thickness of the local regions is measured using a surface profilometer as outline above in the Protruded Height Measurement method in Section (D) of Test Methods. From the local basis weight and height measurements, densities of local regions are calculated as described above.

First, thickness or height of high density recessed regions and low density hollow protruded regions is measured from the sample before cutting out the respective regions for measuring basis weights. For measuring basis weights, cut sections are weighed and their areas measured to calculate basis weight (mass per unit area). Detailed method of measuring basis weight of local regions is outlined below.

Sample Preparation

Sections of local regions—high density recessed regions and low density hollow protruded regions—are carefully cut from the composite substrate using sharp scissors. These sections can be very small—10 to 20 mm across protrusions, as shown in e.g FIG. 12A. At least 10 sections of each region with largest possible sizes are cut. High and low density cut sections are kept separately.

Area Measurements

For measuring areas of small cut sections of local regions, image analysis methods are best suited. An optical scanner capable of at least 300 dpi (dots or pixels per inch) resolution is used. One such scanner is Canon® CanoScan™ 8800F available from Canon U.S.A., Inc., Melville, N.Y., U.S.A. Scanner is used in reflected mode. Sections of each local region are placed flat with their X-Y plane facing scanner bed, and scanned separately in grayscale with black background at 300 dpi resolution. Highest possible contrast setting is used for scanning. For example, in MP Navigator 1.0 scanning software accompanying CanoScan™ 8800F scanner, "High Contrast" Tone Curve setting is used. The scanned image of all sections of each region is saved in TIFF format.

The image is opened in an image analysis software to calculate areas of each cut section pieces. Image analysis software such as ImageJ version 1.48 or greater may be used. ImageJ software is available under public domain license from National Institutes of Health, Bethesda, Md., USA, and can be downloaded freely from http://rsb.info.nih.gov. In ImageJ software, the scale of image is set from "Analyze/Set Scale . . . " menu by setting "Distance in pixels" to be 300 or scanned image resolution in dpi; "Known Distance" to be 25.4; "Pixel Aspect Ratio" to be 1.0; and "Unit of Length" to be "mm" The image is then filtered with a 2 pixel radius "Gaussian Blur" filter selected from "Process/Filter . . . " menu. The image is then binarized (made pure black and white) by using "Otsu" threshold setting from "Image/Adjust/Threshold . . . " menu. The binary image is converted to mask by selecting "Process/Binary/Convert to Mask" menu, and then cleaned up to remove any stray black pixels using a combination of "Erode and Dilate" morphological filters from "Process/Binary" menu. The binary image is then ready for measuring areas each section pieces. From the "Analyze/Set Measurements" menu, "Area" is selected. Areas of all pieces is measured by clicking on "Analyze/Analyze Particles . . . " menu with "Display Results" and "Summarize" boxes checked. Upon executing the command to Analyze Particles, the results show total area of all section pieces, and area of individual pieces. The total area of all section pieces is noted down. The image analysis process is repeated for the second cut section pieces.

Mass Measurements

Mass of each local region's cut sections is measured on a balance capable of measuring up to 0.1 mg (10,000$^{th}$ of a gram). All cut sections of one local region are placed on the balance, and their combined mass is noted down. The process is repeated for the second local region.

Basis Weight Calculation

Basis Weight of each local region is calculated by dividing combined mass of each region's cut sections by their total area measured from image analysis.

H. Pressure Drop Test Method/Dirt Capture

Dirt holding capacity and change in pressure drop as a result of adding dirt are measured via a modified ASHRAE 52.1-1992 method.

1. Measure at least 2 samples of the filter media, 6 or more preferably as prescribed by the method.
2. Measurements are taken on a flat filter sheet, without pleats, wrinkle, creases, etc, at least 14"×14". Particles are then injected across a 1 ft diameter circle of the filter sheet.
3. Orient the material in the test apparatus such that particle hit the same side of the material 1$^{st}$ that will see particles 1$^{st}$ in the device, if the material has different properties depending on orientation. If the material is non-homogenous across the area, sample representative materials.
4. Run the test with an air filter face velocity chosen to closely match the air filter face velocity in the device based on the air filter surface area used in the device and air flow rate in the device, load to 6 grams of dirt, use ISO Fine A2 dirt (as defined in ISO 12103-1), and load in increments of 0.5 g. Measure resistance after each 0.5 g addition.

I. Single Pass Efficiency Test Method

Single pass filtration properties of a filter substrate may be determined by testing in similar manner to that described in ASHRAE Standard 52.2-2012 ("Method of Testing General Ventilation Air-Cleaning Devices for Removal Efficiency by Particle Size"). The test involves configuring the web as a flat sheet (e.g. without pleats, creases or folds) installing the flat sheet into a test duct and subjecting the flat sheet to potassium chloride particles which have been dried and charge-neutralized. A test face velocity should be chosen to closely match the face velocity in the device based on the filter surface area used in the device and air flow rate in the device. An optical particle counter may be used to measure the concentration of particles upstream and downstream from the test filter over a series of twelve particle size ranges. The equation:

$$\text{Capture efficiency}(\%) = \frac{(\text{upstream particle count} - \text{downstream particle count}) \times 100}{(\text{upstream particle count})}$$

may be used to determine capture efficiency for each particle size range. The minimum efficiency for each of the particle size range during the test is determined, and the composite minimum efficiency curve is determined. From the composite minimum efficiency curve, the four efficiency values between 0.3 µm and 1.0 µm may be averaged to provide the E1 Minimum Composite Efficiency ("MCE"), the four efficiency values between 1.0 µm and 3.0 µm may be averaged to provide the E2 MCE, and the four efficiency values between 3.0 µm and 10.0 µm may be averaged to provide the E3 MCE. As a comparison, HEPA filters typically have a single pass efficiency above 99% for both E2 and E3 particles.

EXAMPLES

A substrate is made according to the present invention that includes both staple and continuous fibers. The staple fibers are made from PP, PE, rayon, and combinations thereof. The staple fibers range from about 0.7 dpf to about 7.0 dpf and have cross sections ranging from round to substantially round shapes to complicated shapes with increased surface area such as tri-lobal and 4DG™. In the present invention, from about 30% and about 50% of the staple fibers are low denier of about 0.7 dpf, from about 25% and about 35% of the staple fibers are high denier of about 3.0 dpf and about 7.0 dpf, the remaining staple fibers are rayon. The continuous fibers are PP. The continuous fibers can be but are not limited to spunbond, meltblown, nano.

The present invention is constructed by placing the continuous fiber layer between two mats of staple fibers. The mats of staple fiber can be the same weight of different weights. In this example, the image or pattern side of the web is about 70% to about 80% of the staple fibers by weight, while the non-image or flat side is 20% to about 30% of the staple fibers by weight. The 3 layer structure is then combined via hydro-entanglement. In the final hydro-entanglement step a pattern can be imposed on the web via a patterned roll or the material may be left flat.

Exemplary substrates having a 3 mm screen with 50/50 ratio of recessed to hollow protrusions are provided in Table 1.

TABLE 1

| Sample | First Component Layer (e.g. pattern side carded layer) Staple Fibers | Basis Wt (gsm) | Second Component Layer (e.g. Carrier Web) Construction | Basis Wt (gsm) | Third Component Layer (e.g. flat-side carded backsheet) Staple Fibers | Basis Wt (gsm) | Target Basis Weight (gsm) | Pattern Planar Ratio |
|---|---|---|---|---|---|---|---|---|
| 1 | 50% 1.17 dpf tri-lobal PP T-139 FiberVisions/ 25% 2.97 dpf tri-lobal PP T-177 FiberVisions/ 25% 1.53 dpf round viscose | 35 | Spunbond | 12 | 50% 1.17 dpf tri-lobal PP T-139 FiberVisions/ 25% 2.97 dpf tri-lobal PP T-177 FiberVisions/ 25% 1.53 dpf round viscose | 13 | 60 | 50:50 |
| 2 | 50% 1.17 dpf tri-lobal PP T-139 FiberVisions/ 25% 2.97 dpf tri-lobal PP T-177 FiberVisions/ 25% 1.53 dpf round viscose | 35 | SMNS | 13 | 50% 1.17 dpf tri-lobal PP T-139 FiberVisions/ 25% 2.97 dpf tri-lobal PP T-177 FiberVisions/ 25% 1.53 dpf round viscose | 12 | 60 | 50:50 |
| 3 | 33⅓% 1.17 dpf tri-lobal PP T-139 FiberVisions/ 33⅓% 2.97 dpf tri-lobal PP T-177 FiberVisions/ 33⅓% 6 dpf 4DG™ PET | 35 | Spunbond | 12 | 33⅓% 1.17 dpf tri-lobal PP T-139 FiberVisions/ 33⅓% 2.97 dpf tri-lobal PP T-177 FiberVisions/ 33⅓% 6 dpf 4DG™ PET | 13 | 60 | 50:50 |
| 4 | 33⅓% 1.17 dpf tri-lobal PP T-139 FiberVisions/ 33⅓% 2.97 dpf tri-lobal PP T-177 FiberVisions/ 33⅓% 6 dpf 4DG™ PET | 35 | SMNS | 13 | 33⅓% 1.17 dpf tri-lobal PP T-139 FiberVisions/ 33⅓% 2.97 dpf tri-lobal PP T-177 FiberVisions/ 33⅓% 6 dpf 4DG™ PET | 12 | 60 | 50:50 |
| 5 | 50% 1.17 dpf tri-lobal PP T-139 FiberVisions/ 25% 2.97 dpf tri-lobal PP T-177 FiberVisions/ 25% 1.53 dpf round viscose | 25 | Spunbond | 12 | 50% 1.17 dpf tri-lobal PP T-139 FiberVisions/ 25% 2.97 dpf tri-lobal PP T-177 FiberVisions/ 25% 1.53 dpf round viscose | 13 | 50 | 50:50 |

TABLE 1-continued

| Sample | First Component Layer (e.g. pattern side carded layer) Staple Fibers | Second Component Layer (e.g. Carrier Web) Basis Wt (gsm) | Third Component Layer (e.g. flat-side carded backsheet) Construction | Target Basis Weight (gsm) Basis Wt (gsm) | Pattern Staple Fibers | Basis Wt (gsm) | | Planar Ratio |
|---|---|---|---|---|---|---|---|---|
| 6 | 50% 1.17 dpf tri-lobal PP T-139 FiberVisions/ 25% 2.97 dpf tri-lobal PP T-177 FiberVisions/ 25% 1.53 dpf round viscose | 25 | SMNS | 13 | 50% 1.17 dpf tri-lobal PP T-139 FiberVisions/ 25% 2.97 dpf tri-lobal PP T-177 FiberVisions/ 25% 1.53 dpf round viscose | 12 | 50 | 50:50 |
| 7 | 33⅓% 1.17 dpf tri-lobal PP T-139 FiberVisions/ 33⅓% 2.97 dpf tri-lobal PP T-177 FiberVisions/ 33⅓% 6 dpf 4DG™ PET | 25 | Spunbond | 12 | 33⅓% 1.17 dpf tri-lobal PP T-139 FiberVisions/ 33⅓% 2.97 dpf tri-lobal PP T-177 FiberVisions/ 33⅓% 6 dpf 4DG™ PET | 13 | 50 | 50:50 |
| 8 | 33⅓% 1.17 dpf tri-lobal PP T-139 FiberVisions/ 33⅓% 2.97 dpf tri-lobal PP T-177 FiberVisions/ 33⅓% 6 dpf 4DG™ PET | 25 | SMNS | 13 | 33⅓% 1.17 dpf tri-lobal PP T-139 FiberVisions/ 33⅓% 2.97 dpf tri-lobal PP T-177 FiberVisions/ 33⅓% 6 dpf 4DG™ PET | 12 | 50 | 50:50 |
| 9 | 50% 0.99 dpf tri-lobal PP T-139 FiberVisions/ 25% 2.97 dpf tri-lobal PP T-177 FiberVisions/ 25% 1.53 dpf round viscose | 35 | SMNS | 13 | 50% 0.99 dpf tri-lobal PP T-139 FiberVisions/ 25% 2.97 dpf tri-lobal PP T-177 FiberVisions/ 25% 1.53 dpf round viscose | 12 | 60 | None |
| Control 1 | 100% 1.53 dpf round PET | 35 | Spunbond | 12 | 100% 1.53 dpf round PET | 13 | | 50:50 |
| Control 2 | 60% 0.9 dpf tri-lobal PP 20% 2.97 dpf tri-lobal PP 20% 1.53 dpf round viscose | 52 | | | None | | | <40:60 |
| Control 3 | 50% 0.9 dpf tri-lobal PP 25% 2.97 dpf tri-lobal PP 25% 1.53 dpf round viscose | 60 | | | None | | | No |

TABLE 2

| Sample | Actual Basis Weight | Particle Capture Efficiency | | | Initial Pressure Drop |
|---|---|---|---|---|---|
| | | E1 (% 0.3-1 μm) | E2 (% 1-3 μm) | E3 (% 3-10 μm) | |
| Control 1 | 61 | 12 | 26 | 64 | 5.0 |
| Control 2 | 52 | 12 | 21 | 58 | 10.0 |
| Control 3 | 64 | 33 | 48 | 78 | 13.7 |
| 1 | 56 | 18 | 35 | 72 | 5.6 |
| 2 | 59 | 22 | 41 | 77 | 7.5 |
| 3 | 62 | 13 | 25 | 59 | 5.0 |
| 4 | 61 | 16 | 30 | 66 | 5.0 |
| 5 | 53 | 20 | 35 | 69 | 5.0 |
| 6 | 54 | 23 | 40 | 75 | 8.0 |

TABLE 2-continued

| Sample | Actual Basis Weight | Particle Capture Efficiency E1 (% 0.3-1 μm) | E2 (% 1-3 μm) | E3 (% 3-10 μm) | Initial Pressure Drop |
|---|---|---|---|---|---|
| 7 | 58 | 14 | 24 | 53 | 4.5 |
| 8 | 56 | 18 | 31 | 64 | 6.6 |
| 9 | 61 | 41 | 57 | 85 | 17.4 |

Table 2 shows the particle capture efficiency (i.e. measuring how many particles are going through sample substrates) for samples 1-9 and a Controls 1-3, all shown in Table 1. The particle capture efficiency is determined after a first pass using the single pass filtration method identified herein. Values in Table 1 are a percent of particles captured (by size of particles).

Figure 15:
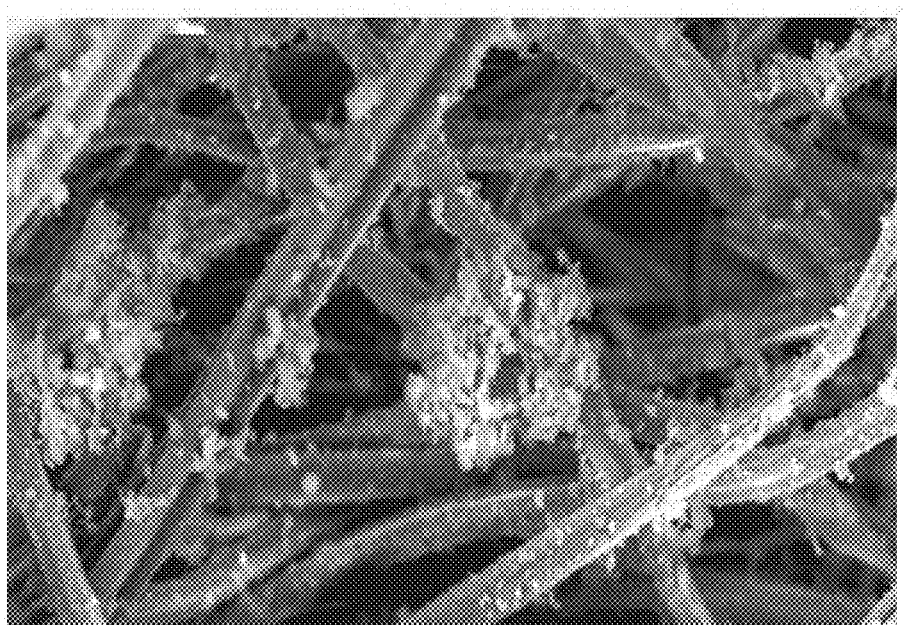
FIG. 15 is a magnified image showing dirt captured by a component layer comprising low and high denier tri-lobal fibers and round viscose fibers.
Figure 16:
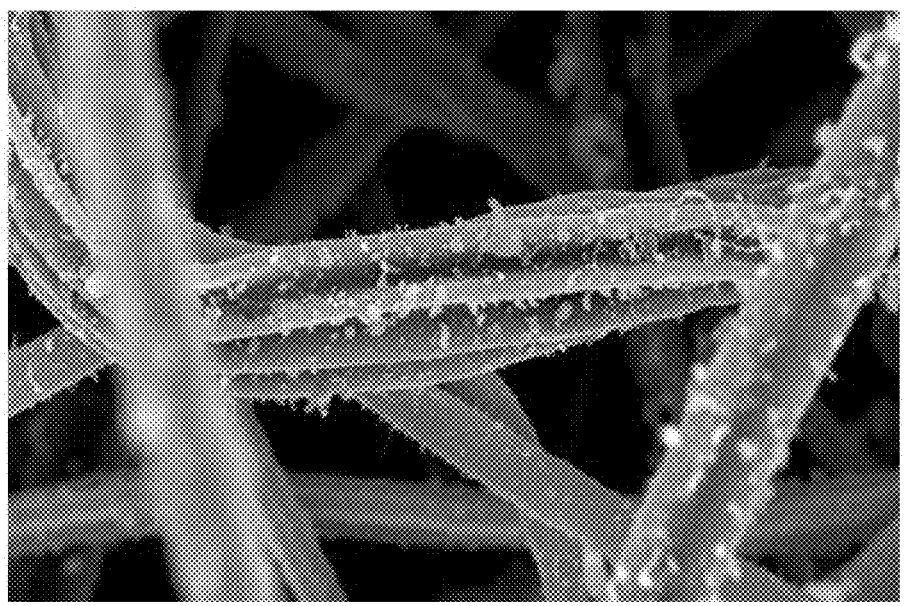
FIG. 16 is a magnified image showing dirt captured by a component layer comprising high denier tri-lobal and 4DG™ fibers.
Figure 17:
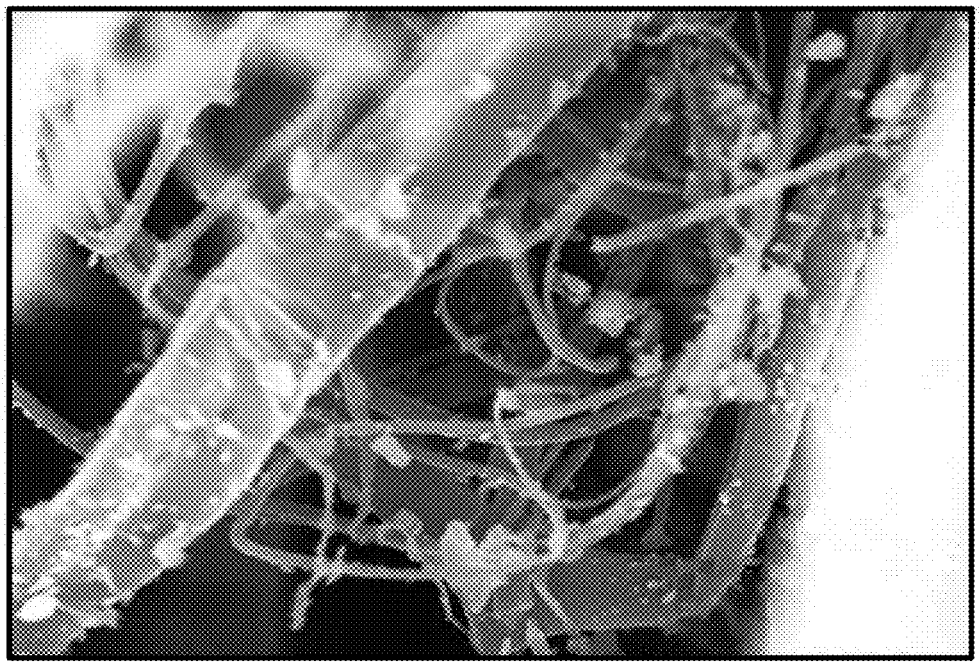
FIG. 17 is a magnified image showing dirt captured by a component layer comprising round nano fibers and round polypropylene spunbond and round meltblown fibers.
Figure 19:
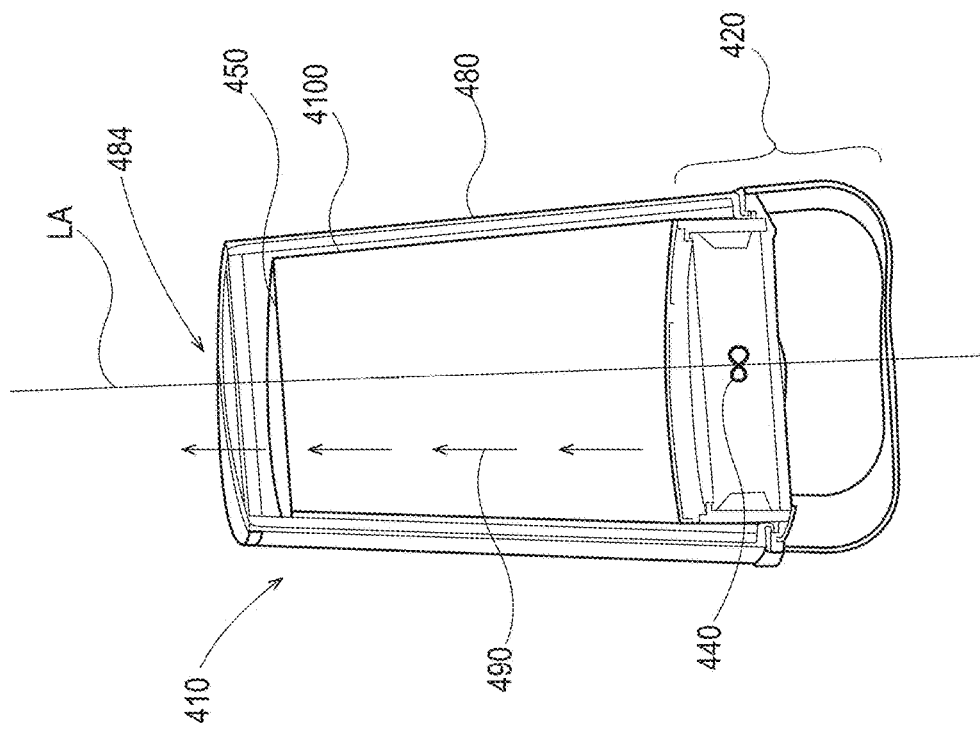
FIG. 19 shows a cross-sectional view of the air filtering device in FIG. 18.
Figure 18:
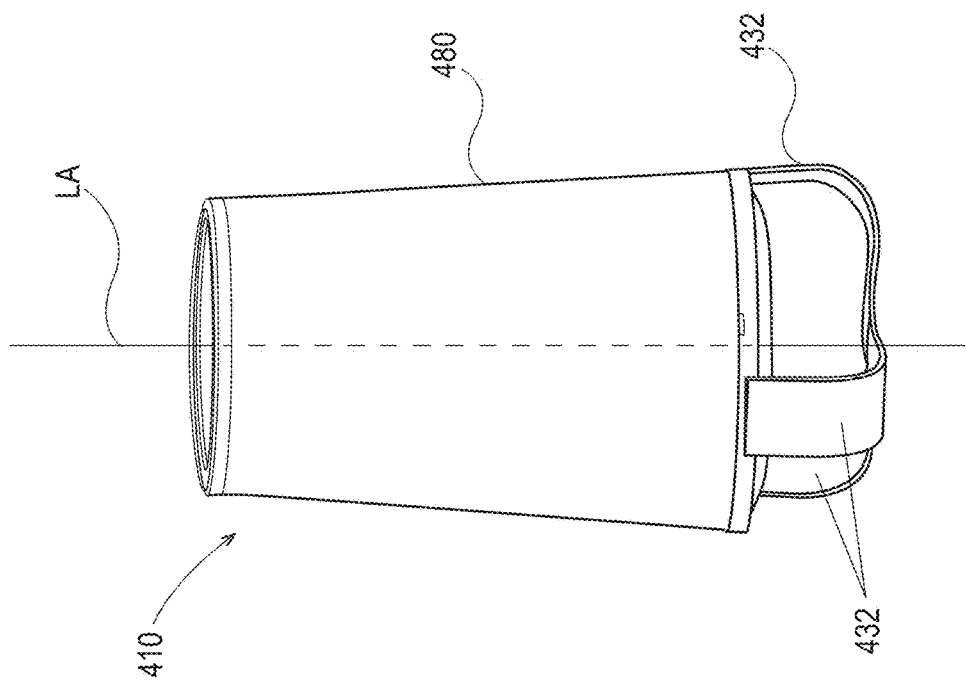
FIG. 18 shows one embodiment of an air filtering device in accordance with the present invention.
Figure 20:
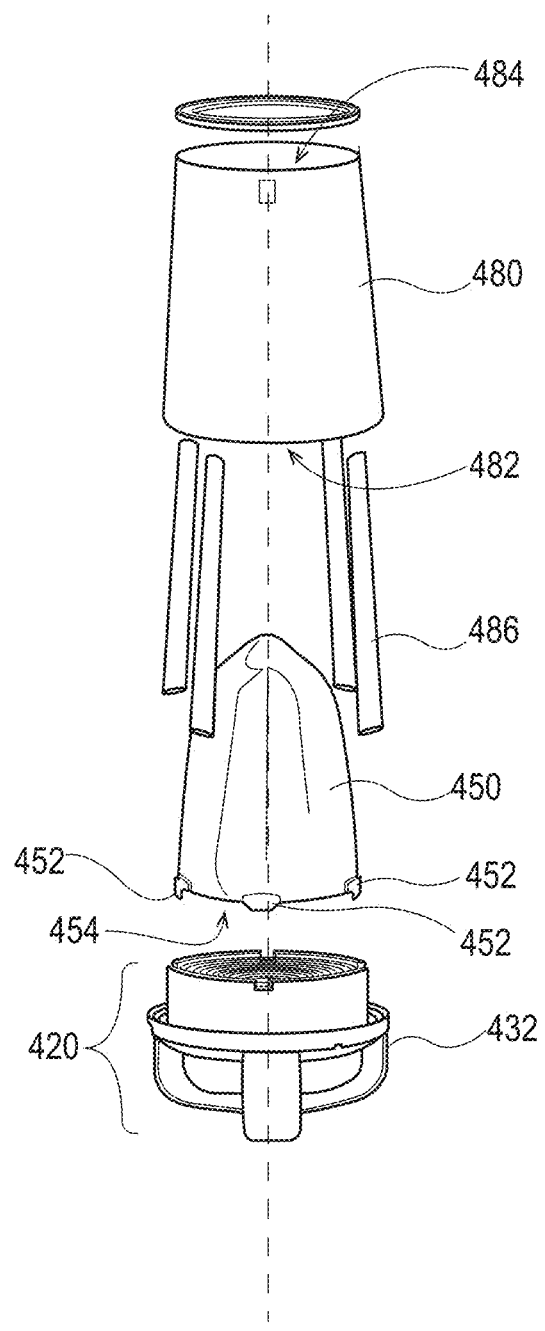
FIG. 20 shows an exploded view of the air filtering device in FIG. 18.

The particles captured by particular fibers in Samples 1-4 are shown in FIGS. 15-17. FIG. 15 shows dirt captured by Sample 2 which includes a component comprising low and high denier tri-lobal fibers and round viscose fibers. FIG. 16 shows dirt captured by a component layer in Sample 4 comprising high denier tri-lobal and 4-deep grooved fibers. FIG. 17 shows dirt captured by a component layer in Sample 8 comprising round nano fibers and round PP spunbond and round meltblown fibers.

Figure 12A:
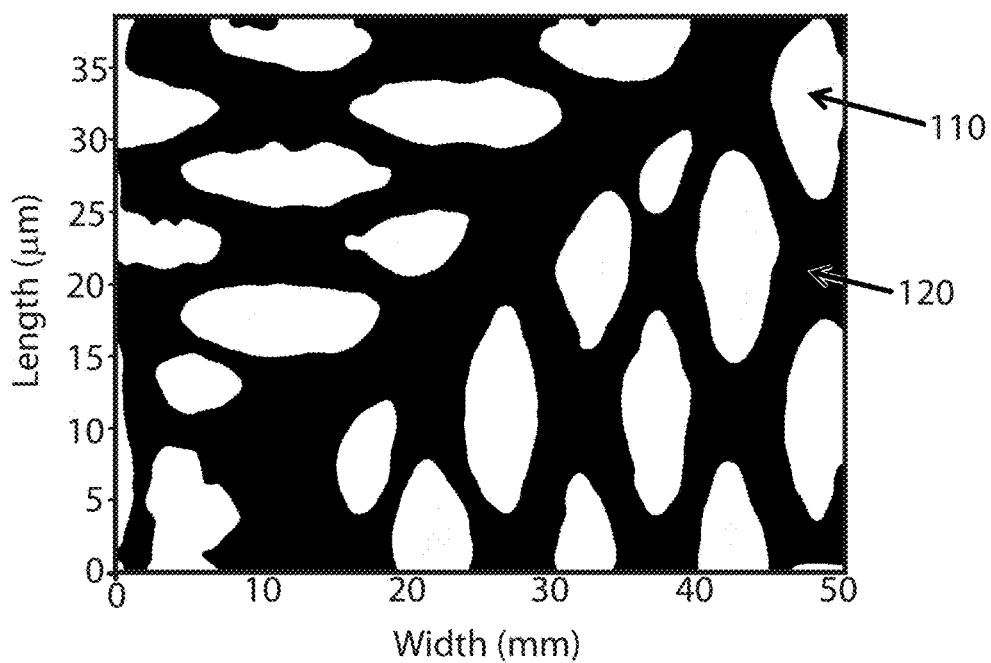
FIGS. 12A and 12B are binary 2D projections of 3D images (from a GFM MikroCAD optical profiler instrument) showing various embodiments of substrates having various hollow protrusion patterns, all with a planar area ratio of 40:60.
Figure 12B:
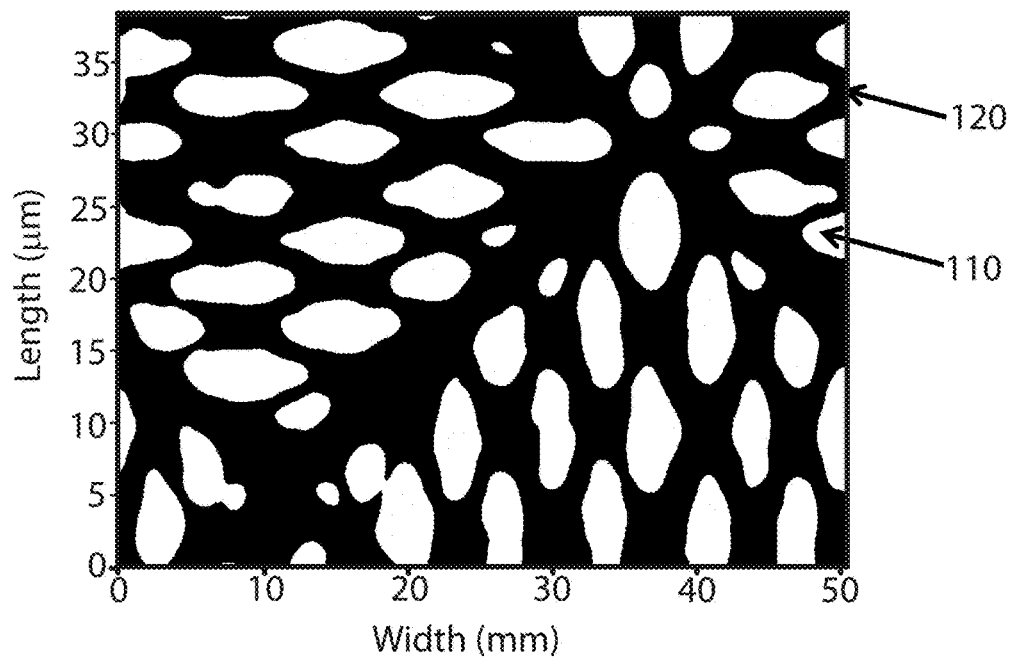

Table 3 shows a comparison of substrate thickness, density, hollow protrusion height in the first component layer, protrusion and recessed regions densities and basis weights for Control 1, Samples 1, 2, 4, and 6 from Table 1; and Sample 12A and 12B represented in FIGS. 12A and 12B, respectively. Samples 12A and 12B have the same fiber composition and construction for all component layers as Sample 2 from Table 1. However, Sample 12A has a basis weight of 60.4 gsm and Sample 12B has a basis weight of 61.2 gsm. Both samples 12A and 12B have a hollow protrusion-to-recessed region planar area ratio of 40:60, and are made by the same method as Sample 2 of Table 1. Additionally, Samples 1 and 2 have specific surface area of 129 m$^2$/g and 141 m$^2$/g, respectively.

TABLE 3

| Sample | Thickness (mm) | Substrate Density (kg/m$^3$) | Protrusion Height (mm) | Protrusion Region Density (kg/m$^3$) | Recessed Region Density (kg/m$^3$) | Protrusion Region Basis Weight (gsm) | Recessed Region Basis Weight (gsm) |
|---|---|---|---|---|---|---|---|
| Control 1 | 1.45 | 42 | 1.18 | — | — | — | — |
| 1 | 1.39 | 40 | 0.85 | 37 | 45 | 66 | 54 |
| 2 | 1.38 | 43 | 0.94 | 34 | 69 | 61 | 56 |
| 4 | 2.02 | 30 | 1.30 | 22 | 34 | 64 | 51 |
| 6 | 1.30 | 42 | 0.90 | — | — | — | — |
| 12A | 1.84 | 33 | 1.64 | 19 | 38 | 61 | 58 |
| 12B | 1.63 | 38 | 1.24 | — | — | — | — |

Table 4 shows the PVD for the various samples tested above.

TABLE 4

| | Control 1 | Sample 1 | Sample 2 | Sample 3 | Sample 4 |
|---|---|---|---|---|---|
| <50 μm | ~20% | ~27% | ~31% | ~16% | ~14% |
| 50-100 μm | ~49% | ~46% | ~45% | ~43% | ~41% |
| >200 μm | ~14% | ~10% | ~9% | ~14% | ~15% |

All percentages, ratios and proportions used herein are by weight unless otherwise specified.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "90" is intended to mean "about 90°".

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of filtering particulates from the air comprising the steps of:
   a. providing an air filtering device in a room, wherein said device comprises
      a fan; and
      an air filter bag having an open end to receive air from said fan, the air filter bag comprising:
         a first component layer comprising:
            a mixture of fibers comprising shaped fibers having at least two different deniers, wherein each fiber in said mixture comprises a denier from about 0.7 dpf to about 7.0 dpf;
            a plurality of hollow protrusions and recessed regions, wherein said hollow protrusions comprise a protruded length from about 3 mm to about 16 mm and a non-protruded length from about 2 mm to about 14 mm and a protruded height from about 0.5 mm to about 3 mm, and wherein said hollow protrusions and recessed regions comprise a planar area ratio from about 40:60 to about 60:40; and a second component layer comprising at least about 50% of fibers having a denier from about 0.9 dpf to about 2.0;

a third component layer, wherein the second component layer is disposed between the first and third component layers;

a plurality of connections connecting said first component layer and said second component layer, wherein the plurality of connections comprise mechanical interpenetration of fibers, wherein said air filter bag has a thickness from about 1 mm and about 3 mm and a basis weight from about 30 gsm to about 100 gsm; and b. activating said fan to move about 70 to about 150 CFM of air to said air filter bag with an air pressure drop through said air filter bag of about 4 Pa to about 25 Pa.

2. The method of claim 1, wherein said fan moves about 70 to about 100 CFM of air to said air filter bag and the air pressure drop through said air filter bag is about 4 Pa to about 20 Pa.

3. The method of claim 1, further comprising the step of activating said device for a period of at least about 20 minutes whereby greater than 40% of particulates of about 1 microns to about 10 microns are removed from the air in said room.

4. The method of claim 1, wherein said device further comprises a substantially air impermeable outer sleeve comprising a first open end, a second open end, and an air flow path therebetween, wherein said outer sleeve envelops said air filter bag around its longitudinal axis.

5. The method of claim 4, wherein the exit velocity of a volume of air exiting said second open end at about 0.6 to about 2.6 m/s when said device is activated.

6. The method of claim 1, wherein said air filter bag has a single pass filtering efficiency of greater than 15% for E1 particles, and about 20% to about 70% of E2 particles, and about 50-90% of E3 particles, and a pressure drop of less than about 20 Pa.

7. The method of claim 1, wherein said mixture of fibers in said first component layer comprises a first tri-lobal fiber having a denier from about 0.9 dpf to about 2.0 dpf and a second tri-lobal fiber comprising a denier from about 2.7 dpf to about 3.0 dpf.

8. The method of claim 1, wherein said the first component layer and the second component layer are hydroentangled.

9. The method of claim 1, wherein said mixture of fibers in said first component layer further comprises a multi-lobal deep-grooved shaped fiber having a denier from about 5.0 dpf to about 7.0 dpf.

10. The method of claim 1, wherein said mixture of fibers in said first component layer further comprises an irregular shaped fiber having a denier from about 1.0 dpf to about 2.0 dpf.

11. The method of claim 1, wherein said second component layer further comprises at least about 5% of fibers having a denier from about 0.0001 dpf to about 0.006 dpf.

12. The method of claim 1, wherein said air filter bag has an air flow surface area of about 0.1 m$^2$ to about 1 m$^2$.

* * * * *